(12) United States Patent
Soon-Shiong et al.

(10) Patent No.: US 12,010,451 B2
(45) Date of Patent: *Jun. 11, 2024

(54) DISTRIBUTED COMMAND EXECUTION IN MULTI-LOCATION STUDIO ENVIRONMENTS

(71) Applicants: NantStudios, LLC, Culver City, CA (US); Nant Holdings IP, LLC, Culver City, CA (US)

(72) Inventors: Patrick Soon-Shiong, Los Angeles, CA (US); Gary Marshall, Los Angeles, CA (US); Keaton Heinrichs, Los Angeles, CA (US); John Wiacek, Los Angeles, CA (US); Nicholas James Witchey, Laguna Hills, CA (US)

(73) Assignees: Nant Holdings IP, LLC, Culver City, CA (US); NantStudios, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,867

(22) Filed: Aug. 3, 2023

(65) Prior Publication Data
US 2023/0388439 A1 Nov. 30, 2023

Related U.S. Application Data

(63) Continuation of application No. 17/874,728, filed on Jul. 27, 2022, now Pat. No. 11,765,306.
(Continued)

(51) Int. Cl.
*H04N 5/222* (2006.01)
*G06F 9/48* (2006.01)
(Continued)

(52) U.S. Cl.
CPC ......... *H04N 5/2228* (2013.01); *G06F 9/4881* (2013.01); *G06F 9/546* (2013.01); *G06Q 10/101* (2013.01); *G06F 2209/548* (2013.01)

(58) Field of Classification Search
CPC . H04L 41/5048; H04N 5/2228; G06F 9/4881; G06F 9/546; G06F 2209/548; G06Q 10/101
See application file for complete search history.

(56) References Cited

U.S. PATENT DOCUMENTS 7,313,810 B1 * 12/2007 Bell .................. H04N 21/8146
348/E7.063
7,852,372 B2 12/2010 Sohmers
(Continued)

FOREIGN PATENT DOCUMENTS

WO WO-2015144014 A1 10/2015

*Primary Examiner* — El Hadji M Sall
(74) *Attorney, Agent, or Firm* — Harness Dickey & Pierce P.L.C.

(57) ABSTRACT

A distributed studio management system includes a computing system having a computer readable memory and a processor. The computing system is associated with a first production facility that is remote to a second production facility. The processor is configured to perform the operations of receiving a set of device commands having commands targeting first and second devices in the first production facility and where the set of device commands are related to the second production facility, enqueuing a first command from the device commands into a first command queue assigned to the first device and a second command from the device commands into a second command queue assigned to the second device according to each device command's synchronized execution times, and causing the first and second devices to execute commands from their respective command queues relative to each other according to the commands' respective synchronized execution times.

21 Claims, 6 Drawing Sheets

Related U.S. Application Data

(60) Provisional application No. 63/229,674, filed on Aug. 5, 2021.

(51) Int. Cl.
*G06F 9/54* (2006.01)
*G06Q 10/101* (2023.01)

(56) References Cited

U.S. PATENT DOCUMENTS

| | | |
|---|---|---|
| 9,264,678 B2 | 2/2016 | Nuyttens et al. |
| 9,454,789 B2 * | 9/2016 | Lord ................. H04N 21/6581 |
| 9,602,853 B2 | 3/2017 | Naggar et al. |
| 10,652,590 B2 * | 5/2020 | Barnich ................. H04N 21/23 |
| 2023/0046002 A1 | 2/2023 | Soon-Shiong et al. |

* cited by examiner

DISTRIBUTED COMMAND EXECUTION IN MULTI-LOCATION STUDIO ENVIRONMENTS

CROSS-REFERENCE TO RELATED APPLICATIONS

This application is a continuation of U.S. patent application Ser. No. 17/874,728 filed Jul. 27, 2022, which claims the benefit of U.S. Provisional Application No. 63/229,674 filed Aug. 5, 2021. The entire disclosures of the above applications are incorporated herein by reference.

FIELD

The present disclosure relates to facilitating remote command and control via distributed, synchronized command queues.

BACKGROUND

Film studios typically employ green screen technologies, blue screen technologies, or more recently LED wall technologies to film content for movies, television, motion capture, or for other purposes. Such technologies allow for enhanced special effects and unique filming backgrounds. If a studio relies on a green or a blue screen technology, a director is unable to view a final composition of the content until post-production work is complete. This may take weeks, if not months, to complete, which in turn generates additional costs or delays in production. As such, necessary reshoots may be delayed. If a studio relies on LED wall technology, a director may be able to view portions (e.g., animated backgrounds, etc.) of a final composition of the content before post-production work is complete.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A content production management system within a distributed studio environment or ecosystem includes at least one computer-readable medium, at least one command interface module, and at least one command queue management module in communication with the command interface module. The at least one command interface module is configured to render or otherwise present at least one user interface for a set of content production entities. Each content production entity from the set of content production entities is associated with a content production volume from a set of content production volumes within the distributed studio environment. The at least one command queue management module, upon execution of software instructions, is configured to perform the operations of receiving a set of commands from the at least one command interface module and assigning an execution time, possibly a synchronized execution time, to each command of the set of commands. Each command of the set of commands targets a target content production entity from the set of the content production entities. The at least one command queue management module, upon execution of software instructions, is further configured to perform the operations of enqueueing each command of the set of commands into a command queue associated with the target content production entity according to its respective synchronized execution time, and enabling the target content production entity to execute each command of the set of commands from the command queue according to its respective synchronized execution time. The command queue is stored in the computer-readable medium.

A computerized method of managing a set of commands in a content production management system within a distributed studio environment is also disclosed. The content production management system includes a command interface module and a command queue management module in communication with the command interface module. The command interface module is configured to render or otherwise present at least one user interface for a set of content production entities, and each content production entity from the set of content production entities is associated with a content production volume from a set of content production volumes within the distributed studio environment. The method includes receiving, from the command interface module, a set of commands, and assigning, with the command queue management module, a synchronized execution time to each command of the set of commands. Each command of the set of commands targets a target content production entity of a set of the content production entities. The method further includes enqueueing, with the command queue management module, each command of the set of commands into a command queue associated with the target content production entity according to its respective synchronized execution time, and enabling the target content production entity to execute each command of the set of commands from the command queue according to its respective synchronized execution time.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
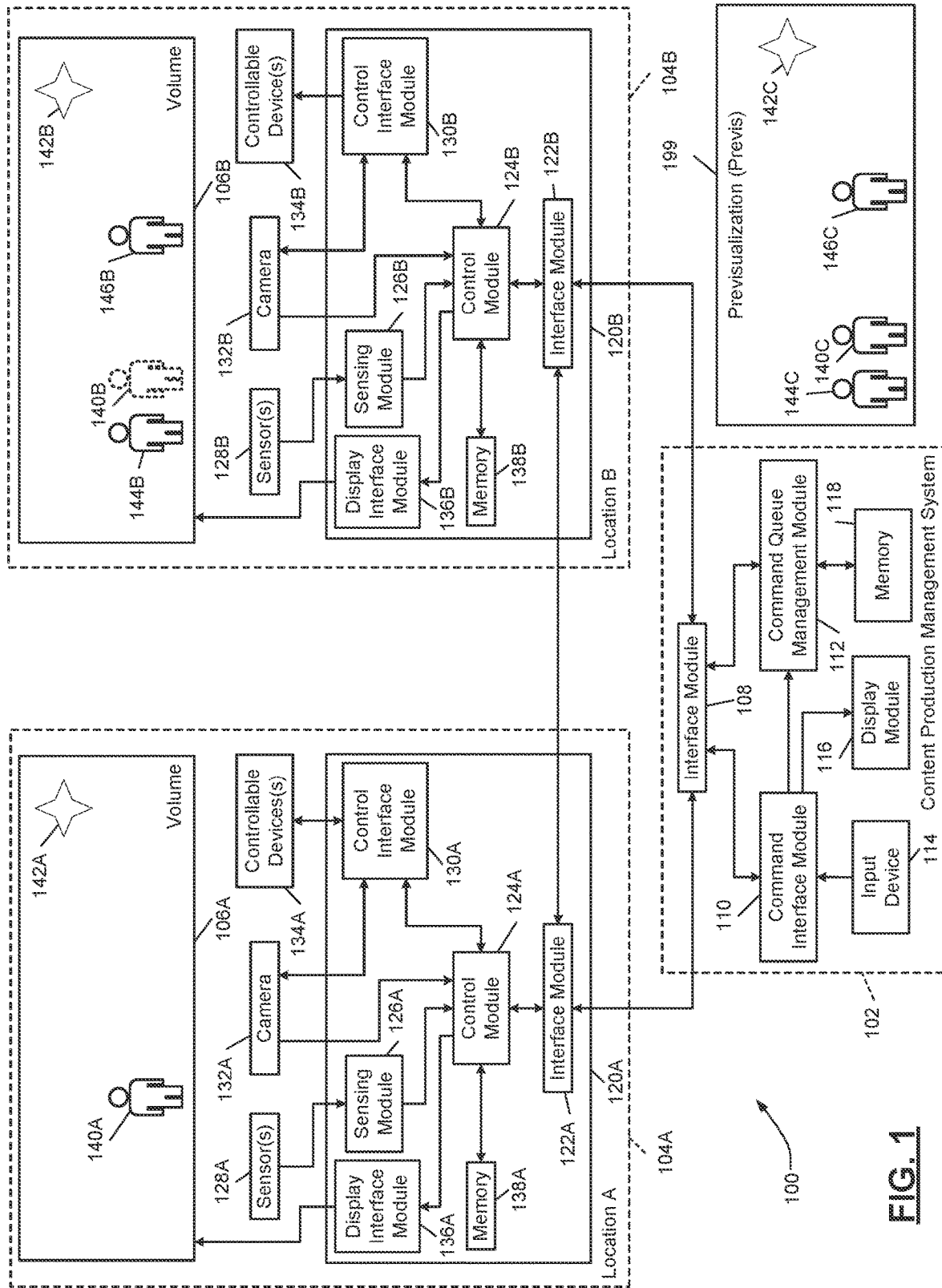
FIG. 1 is a functional block diagram of a distributed studio environment in which the principles of the present disclosure can be implemented.

The present disclosure describes solutions for directing or coordinating entities associated with multiple content production volumes in a distributed content production environment. For example, a filming session for a film may include many pieces of equipment, extras, stage crew, actors, props, lights, light sensors, microphones, cameras, displays, devices, robots, etc. that must coordinate activities within a single filming volume at one studio, among multiple volumes at one studio, and/or among multiple volumes at multiple remote, possibly geographically distributed studios, say in Los Angeles, USA and in London, England. This coordination of activities may be accomplished even if latencies are present between the multiple remote studios. For instance, when the entities are located across multiple remote studios, possibly over vast geographic distances (e.g., 10 km, 100 km, 1000 km, etc.), with one or more latencies there between, the solution may direct or coordinate the entities in synchronicity across the remote studios to ensure content production efficiency is maintained or streamlined, especially with respect to integration of content. Thus, if each studio has a volume that comprises a LED wall, and each volume has moving elements (e.g., cameras, booms, robots, actors, props, etc.), the LED wall and the moving elements in each studio may operate in sync with each other so that their individual portions of a content can be quickly integrated into a nearly final, if not final, rendering of the desired content. In other words, if the LED wall in one studio transitions in a certain way as a camera moves, the LED wall and camera in another studio may transition and move in a similar or coordinated manner. As such, content filmed from multiple remote studios may be combined or otherwise integrated to create a single seamless production that is rendered to a director or other stakeholder during the filming session. For example, by combining multiple frames of film footage from remote studios into a single frame, the director may make real-time adjustments (e.g., lighting adjustments, sound adjustments, camera adjustments, actor and/or prop space adjustments, etc.) during filming and reshoots, thereby reducing the time required for (and the cost of) post-production work. Thus, one should appreciate the disclosed inventive subject matter provides for coordination of many target devices or other target entities in a synchronized fashion even in view of latency of communication among the various entities at their remote, geographically distributed studios.

The solutions may be implemented to direct or coordinate content production entities distributed throughout the world. For example, the solutions may employ a dynamically resourced global stage network with always-on connectivity that routes data through localized data centers. For instance, a shoot with actors on a stage in London, England. with content and set-pieces on another stage in Los Angeles, USA and virtual art department elements pulled from a computer device in Sydney, Australia may have all of their streams pulled together in a "virtual control room/brain bar," or NORAD-like command center with collaborators both physically on set at any of the locations, and remote participants at a content production management system, possibly even in a virtual reality environment. In such examples, physical or virtual GPUs may be employed to scale resources to a local stage. Additionally, communication between the remote locations over the network may be provided via fat pipe point-to-point connectivity. In some examples, each stage may operate independently of the network as its own silo, sending all the footage to the virtual control room to be combine into a single video.

Additionally, one should appreciate the solutions may be employable across the full spectrum of real and virtual worlds. For example, the sets, entities, volumes, etc. herein may be implemented in physical reality (PR), mixed reality (MR), mixed physical reality (MPR), augmented reality (AR), virtual reality (VR), projected reality (PrR), etc.

In some examples, the solutions may be implemented as a content production management system including a centralized command and control computer module. In such examples, the centralized command and control computer module may function as a "NORAD" of a production session in that it provides one or more stakeholders (e.g., directors, producers, writers, artist, cast members, stage managers, etc.) multiple user interfaces possibly corresponding to different entities (e.g., actors, props, and/or equipment such as cameras, camera tracking systems, microphones, lights, light sensors (e.g., Pantone® HUEY™, Pantone® CAPSURE™, Parrot® SEQUOIA™, etc.), motion sensors, speakers, LED walls/ceilings/floors, display modules, etc.) located across multiple remote studios, generates a set of commands for one or more of the target entities, and provides the commands for execution by the target entities or corresponding target devices. These commands may be ordered according to one or more factors. For example, these commands may be time synchronized and executed while accounting for latency among the various entities to ensure the commands are properly executed relative to each other regardless of the physical location of the executing device. One non-limiting example of latencies between various entities at physical locations (e.g., location A, location B, location C, and a stakeholder (SH) location) is shown below in Table 1.

TABLE 1

| | Execution offset from absolute time | Latency to Loc. A | Latency to Loc. B | Latency to Loc. C | Latency to SH Loc. |
|---|---|---|---|---|---|
| Loc. A | −50 ms | 0 | 70 ms | 200 ms | 50 ms |
| Loc. B | −180 ms | 70 ms | 0 | 120 ms | 180 ms |
| Loc. C | −95 ms | 200 ms | 120 ms | 0 | 95 ms |
| SH Loc. | 0 ms | 35 ms | 170 ms | 95 ms | 0 |

For example, the content production management system may include at least one command interface module and at least one command queue management module. The command interface module(s) may support various video/audio conference software platforms (e.g., Google Hangouts™, Teams™, Skype™, Zoom™, etc.). For example, stakeholders at the command interface module(s) may have real-time interactions with actors, grips, choreography personnel, makeup personnel, set personnel, etc. at a remote studio via a video/audio conference software platform.

In some examples, more than one command interface module may be employed. In such examples, each command interface module may be provisioned with permissions, access control lists, etc. for functions determined based on stakeholder requirements. As such, a command interface module employed by a director may have difference permissions, control options, etc. than another command interface module employed by a producer, a writer, etc.

The command interface module(s) may render or otherwise present one or more user interfaces for a set of content production entities associated with a set of content production volumes within a distributed studio environment. The user interfaces may be rendered based on data feeds from one or more studios, content production volumes, content production entities, etc. For example, each command interface module may render one use interface for a single content production entity. In other examples, a single command interface module may render multiple use interfaces corresponding to multiple content production entities.

The content production entities herein may include, for example, any suitable controllable device. For example, the content production entities may include props such as a vehicle, a robot, etc., production equipment such as cameras, light systems, sound systems, sensors, movable platforms, moveable walls, LED walls (e.g., background LED walls, foreground LED walls, static LED walls, moveable LED walls, etc.), LED ceilings, floors, gimbals, display modules, etc., and user devices such as personal computing devices (e.g., smartphones, smartwatches, smart glasses, VR headset, MR headset, tablets, laptops, etc.). In some examples, users such as actors, grips, choreography personnel, makeup personnel, set personnel, etc. may utilize content production entities (e.g., personal computing devices, display modules, LED walls/ceilings/floors, etc.) for receiving commands from one or more stakeholders. For example, a user may be controlled by commands through off-screen visual indicators, digital floor markings, in ear audio instructions, smart glasses, MR headset, portions of the LED wall not in view of a camera, smartwatch, etc.

In some examples, the LED walls, ceilings and/or floors may include touch panel technology, tracking technology (e.g., Mo-Sys™, StYpe™, Vicon™, OptiTrack™, structured light tracking, unstructured light tracking, silhouette tracking, blob detection and tracking, face tracking, audio tracking, kinematics tracking, etc.), count down or count up timers for different commands (further explained below), etc. For example, the LED walls, ceilings and/or floors may display specific commands for a specific individual on a set based on the tracked location of that individual. Additionally, count down or count up timers may move about the LED walls and/or floors as individuals move so that the timers remain close to the individuals thereby providing a cue to individuals when they should take action corresponding to a command. In addition to the timers, cues, or other instructions, markers may be placed on and moved on the LED wall in a manner visible to corresponding target entities (e.g., actors, camera, devices, etc.). The entities may observe such markers and take corresponding action. For example, a marker may be placed on the LED wall to indicate where an actor should be looking during filming a sequence.

The content production volumes herein may include, for example, any area and/or space where motion capture data can be acquired. The volumes may be large, small, built into sets, purpose built, outdoors, stages, studios, rooms, vehicle interiors, etc. The volumes may include, for example, outdoor (or indoor) settings, stages such as sound stages, LED walls (e.g., background LED walls, foreground LED walls, etc.), LED floors, LED ceilings, green screens, public spaces, streets, parks, beaches, buildings, forests, swamps, etc.

In some examples, the content production volumes may be remote from each other. For example, two or more content production volumes may be geographically separated (e.g., 10 km, 100 km, 1000 km, or more). For instance, one volume (associated with one studio) may be located in Los Angeles, USA, Sydney, Australia, etc. and another volume (associated with another studio) may be located in London, England, New York City, USA, etc. Additionally, and/or alternatively, two or more content production volumes may be separated by a latency such as, for example, a network communication latency. For example, one volume may be separated from another volume by a latency of about 5 ms, about 10 ms, about 50 ms, about 100 ms, about 1000 ms, or even greater latencies, etc.

Additionally, the content production volumes may be remote from the command interface module(s) and/or the command queue management module(s). For example, the content production volumes may be geographically separated from the command interface module(s). For instance, a volume may be located in Sydney, Australia and a command interface module may be located in London, England. Additionally, and/or alternatively, the content production volumes and the command interface module(s) may be separated by a latency. For example, a volume may be separated from a command interface module by a latency of about 5 ms, about 10 ms, about 50 ms, or greater, etc.

The command interface module(s) may then generate a set of commands based on, for example, user input provided to the user interfaces or automatically as provided by other devices in the ecosystem via one or more APIs. The command set may include one or more commands. In some examples, at least one of the commands may be generated automatically in response to a defined event. Each command of the set of commands may target a particular (e.g., a target, etc.) content production entity or corresponding target device from the set of the content production entities.

The commands herein may include any suitable command for controlling, directing, or otherwise managing an entity during production. For example, the commands may include instructions for positioning and/or moving cameras, camera properties (e.g., video resolution, adjust camera exposure, frame rate, white balance, ISO, aperture, shutter speed, bitrate, focus, etc.), microphone properties (e.g., microphone volume, microphone boost, microphone input level, pickup pattern, etc.), equipment, props, robots, robotic controllers, actuators, servos, etc., for setting and/or adjusting sound levels, turning lights on/off, adjusting lighting brightness levels, adjusting lighting color, brightness and color for updating content displayed on LED walls, and/or for directing human beings (e.g., actors, grips, choreography personnel, makeup personnel, set personnel, etc.). In some examples, the commands may include network provisioning commands, virtualization commands, sensor commands, device commands, script-related commands, program-related commands, instructional commands to human beings, choreography-related commands, script commands, controller commands, previs-related commands, etc.

The command queue management module(s) are in communication with the command interface module(s). In some examples, the command queue management module(s) may be coupled to the command interface module(s) via a wired (or wireless) connection to transmit data therebetween. For example, the command queue management module may receive the set of commands from the command interface module. If desired, these commands may be stored in a database, local file, remote file, cloud and/or another suitable type of data structure in computer-readable medium.

The command queue management module(s), or other devices, may also assign a synchronized execution time to each command of the received set of commands. As such, commands for different target entities may be issued, transmitted, executed, etc. at precise times. This may allow commands to be executed in synchronization if desired. The term "queue" is used euphemistically to represent a data structure stored in at least one computer readable memory that stores an ordered list of commands. One should appreciate command queues can be FIFO, FILO, deques (i.e., double-ended queues), or other forms of data structures permitting access to and/or management of ordered commands. In more preferred embodiments, command queues are at least order according to execution times. However, in some embodiments, commands in command queues could have other triggering criteria or dependencies. For example, if a set of events are choreographed to take place relative to each other, then enablement or execution of some commands could depend on execution or completion of other commands to ensure executing entities perform their duties relative to each other in a proper manner with respect to the desired order defined by the choreography. Thus, commands in command queues can be linked to other commands in the same queue or in other queues. Further commands in command queues can be linked to the state of other commands (e.g., pending, completed, executing, paused, etc.), which may compose triggering criteria for other commands.

The synchronized execution times for the commands may be determined based on multiple factors including, for example, latency, time related factors, sequencing of commands, other command execution times, or other triggering factors. The latency factor may include, for example, a communication latency, an execution latency, a network latency, human error delay, human reaction time, specific human factors, etc. In some examples, the synchronized execution times of one or more commands may be synchronized relative to an absolute time. In such examples, a network time protocol (NTP), a global positioning system (GPS), etc. to obtain near absolute times, which may be employed to ensure the commands are synchronized relative to the absolute time (e.g., relative to a master clock, GPS clock, etc.). In doing so, the set of commands may be time stamped based on the absolute time. In other examples, the synchronized execution time of one command may be synchronized relative to the synchronized execution time of another command. For example, a command may be assigned an execution time of X, and another command may be assigned an execution time of X+5 ms. In still other examples, the synchronized execution times of the set of commands may be globally synchronized, synchronized with respect to different content production volumes, synchronized with respect to content production entities, synchronized to a geographic location, etc.

The command queue management module(s) may also enqueue (e.g., insert, etc.) each command of the set of commands into a command queue according to its respective synchronized execution time. The command queue may be associated with the particular (e.g., the target, device, entity, etc.) content production entity or corresponding target device. As such, each target content production entity may have a corresponding command queue for sorting, prioritizing, etc. or otherwise managing ordered commands.

The command queue(s) may be stored in computer-readable medium. In some examples, the computer-readable medium may be local to the command queue management module, or remote from the queue management module. For example, the computer-readable medium may be associated with (e.g., located at, a part of, etc.) a target content production entity, associated with (e.g., located at, a part of, etc.) a particular volume, etc. In some examples, the computer-readable medium may be implemented on a server separate from the command queue management module.

In some examples, the command queue management module(s) may instantiate the command queue(s). This may take place in computer-readable medium where the command queue(s) is initially stored or in another computer-readable medium.

The command queue(s) herein may be considered (individually or collectively) a workflow management system and/or state machines. For example, the command queue(s) may be implemented with various data and/or time management techniques such as synchronized, asynchronous, isochronous, real-time, choreographed, etc. data transmission. This may allow, for example, one command to trigger another command to keep in synch.

For example, multiple state machines may be employed, with each state machine associated with one remote studio, a scene filmed at a remote studio, the overall production, etc. Each state machine includes a set of states and each state has one or more commands. In some examples, each of the commands in one state must be executed or optionally bypassed before transitioning to the next state of the state machine. For instance, if one state includes two commands, the two commands must be executed or bypassed before the state machine transitions to the next state having a different set of commands for execution. In some embodiments, the transition to the next state may be delayed, advanced, etc. based on a triggering condition regardless of whether the commands of one state are executed or not. For example, the triggering condition may be based on a determined latency (e.g., latency among different remote studios) as explained herein. In such examples, the triggering condition forcing the state machine associated with one remote studio to transition to the next state may maintain synchronization between other remote studios, and/or with respect to a state machine associated with the overall production.

Additionally, the command queue(s) herein may include various features for implementing data and/or time management techniques. For example, the command queue(s) may include a countdown timer, a count up timer, an activation criteria, a permission, an external trigger (e.g., initiated by a person, device, etc.), a link to a notarized ledger, a link to associated command queues, a link to a previously executed queue, a link to a future queue, etc. All the queues or associated data can be stored on a notarized ledger (e.g., distributed ledger, blockchain, hash graph, smart contract system, etc.) that may include all the queues times, their information, the time that the information was presented, when their information was delivered, all the cues that were presented and their presentation time, when any information was generated by the system or inputted to the system by an individual or device. The ledger can later be used to analyze what went wrong in a film shot and why. For example, the ledger can be used to detect problems with hardware and software, detect malicious behavior, help pin point source of any problems in terms of creating latency, detect where the largest latency is introduced, provide auditing services for those paying for production, etc. In this sense, storing command queues or other command queue related information in a notarized ledger (e.g., distributed ledger, blockchain, hash graph, Ethereum, BitCoin, etc.) provides for authenticating or verifying filming production at a later time. In some embodiments, the actual production may be stored off-ledger (e.g., IPFS, etc.), while the ledger itself may have blocks or other data that point to the off-ledger storage locations. This off-ledger storage approach is advantageous because large amounts of data may be managed separately from the notarized ledger to reduce bloat on the ledger.

In some examples, the command queue management module(s) may transmit commands to target content production entities. For example, the command queue management module(s) may transmit one or more commands of the set of commands, all of the commands, etc. to a particular content production entity via a network. As such, the command queue management module(s) may deliver commands individually for execution and/or for placement in a local queue at the target content production entity (e.g., in a device memory, camera memory, on a LED wall, in a game engine, etc.). In other examples, the command queue management module(s) may transmit over one or more networks the whole command queue rather than individual commands. For example, the command queue management module(s) may transmit to a particular content production entity (e.g., over a network) the command queue associated with that production entity.

Additionally, the command queue management module(s) may enable the target content production entity to execute each command of the set of commands from the command queue according to its respective synchronized execution time. For example, if the command queue is stored in computer-readable medium located remote from the command queue management module (e.g., at the target content production entity, at an associated content production volume, etc.), the command queue management module may transmit a signal to the target content production entity to execute the commands from the command queue.

The content production management system may provide three- or more dimensional control over target content production entities. For instance, the content production management system may control only three-dimensional movement of one or more target content production entities, control three-dimensional movement and timing of one or more target content production entities, etc. For example, through the commands, the target content production entities such as gimbals, moveable platforms, LED walls/floors/ceilings, cameras, lights, microphones, robots, etc. may be moved as desired. For instance, a first studio may include a background LED wall (e.g., a first target content production entity, etc.) for displaying a mountain, a sky, a landscape, etc., a second studio may include a moving rowboat (e.g., a second target content production entity, etc.), and a third studio may include a foreground LED wall (e.g., a third target content production entity) for displaying water and fish. Each of these three components may be coordinated in synchronization (or a known synchronized delay such as, for example, a hundred milliseconds) such that three-dimensional movement of the three components may be controlled via commands. One should appreciate while it is possible these various entities could be in the same geolocation, it is specifically considered that the entities and the studios are distributed over geographic distances. Further, the command and control center where the content is integrated or presented to a stakeholder could also be remote relative to the studios. Thus, in more interesting embodiments, the synchronization of the various entities at the studio can be synchronized with respect to the observer at the command and control center rather than globally synchronized to an absolute time. Said another way, execution of commands in the command queues for the various distributed entities can include appropriate execution time delays so that when the resulting data from the various studios is sent to the command and control center arrive at the same time, are presented at the same time, or otherwise provided to the stakeholder at their preferred times.

Content from the different (e.g., remote) studios/sets may be combined (or time-aligned and then combined) into one shot and provided to the centralized command and control computer module ("NORAD") and/or each of the studios for viewing. By combining content filmed from different studios/sets, time associated with post-production work may be reduced. For example, a main actor may be filmed in an action scene on a spaceship using a glass sword wearing chrome armor. This type of scene does not lend itself to green screens or blue screens as reflections in the armor and the sword will be blue or green thereby causing imaging problems. However, if the background of a scene is rendered on the LED wall relative to the camera tracking position, the background image will have the correct refractions and reflections, without requiring immense post-production work. This can be achieved in real time using game engine software (e.g., UnReal® game engine, Unity® game engine, Godot game engine, Blender™ renderer, etc.). Additionally, if the scene has extras and/or props around the main actor, these elements may be filmed at studios remote from the main actor and combined with content of the main actor during production. Such arrangements may eliminate travel to different locations, ease scheduling issues, etc.

In some examples, some content production entities may need to be informed on the status or state of other content production entities. For example, a camera may capture content on a LED wall. If the camera is moved or a setting is changed (e.g., to a different angle, a different latitudinal position, a different longitudinal position, a different orientation, a different elevation, a different zoom position, a different ISO setting, a different shutter speed, a different aperture setting, a different frame rate, a different white balance setting, a different focus, etc.), it may be desirable to update the LED wall to account for the different perspective the camera should be seeing. In some examples, the LED wall may be updated via commands based on transformation matrices, projection matrices, etc. used in, for example, rendering 3D realistic environments for video games, architectural designs, simulations, 3D animations, etc. For example, the LED wall may be updated through commands relating to the operation of a virtual camera in a game engine, which is used to render the LED wall.

In other examples, a previs compiler may be created that shows what is expected during production if, for example, the camera is moved. For example, an error may be identified based on the camera movement in the previs compiler and then a remedial action may be taken (in the actual production) to update the LED wall when the camera is moved. One should appreciate these capabilities can be manifested via the commands in the command queues. For example, the previs compiler may be configured to generate coordinated state machines each associated with a remote studio, a scene filmed at a remote studio, the overall production, etc. as explained herein. A state of a state machine associated with a remote studio may include a command to move a camera at the studio. If the command is executed (e.g., the camera is moved), this state machine and/or another state machine associated with another remote studio may transition to a new state and execute a command therein to, for example, update a LED wall, cause a device or actor to move, etc. based on the movement of the camera. Further, in some embodiments, such actions may be combined with simulation. For instance, the command to move the camera may be simulated to show behaviors resulting from such movement. In such examples, the state machine may execute a command to simulate the movement of the camera, and then the same state machine and/or another state machine associated with another remote studio may transition to a new state and execute a command therein to, for example, update a LED wall, cause a device or actor to move, etc. based on the simulated movement of the camera.

Additionally, it may be desirable to calibrate cameras via commands or command queues from the different studios so distortions are not introduced into the combined content. Such calibration via commands may be made to the angle of the cameras, the focus of the camera, the lens of the cameras, etc. For instance, a distortion could be introduced from a lens. Having the video content from one studio placed as the backdrop on a LED wall at another studio may (in some cases) multiply this distortion. In some examples, this issue can be resolved by calculating the distortion before rendering each backdrop on the LED wall, and calibrating the lens accordingly based on submitted commands. Additionally, a skewing distortion may be introduced during filming when angles of cameras do not match. In some examples, this issue can be resolved by relying on a skewing matrix, and a difference in angles between the original camera that captured the content and the camera that is going to be capturing it for the rendered backdrop on the LED wall.

It may be also desirable to calibrate lights from the different studios to ensure real objects in the film appear correctly. For example, lights from different studios may be calibrated via commands to ensure extras, object, creatures (e.g., aliens, dragons, etc.) do not appear different or out of place in the combined content than a lead actor.

Further, production elements from the content production management system can be minted as non-fungible tokens (NFTs). For example, actual production events and/or specific actions (e.g., moments, scenes, bloopers, delivered spoken lines, VFXs, etc.) may be minted as one or more NFTs. Additionally, final edit files may be minted and used for generating and storing NFTs. Thus, one aspect of the inventive subject matter is considered to include creating commands that mints or causes to be minted an NFT during production. This can be achieved by submitting an NFT to a distributed ledger, a smart contract ledger, or other notarized ledger. For example, an NFT can be minted according to ERC-721 (see URL eips.ethereum.org/EIPS/eip-721 for Ethereum improvement protocols), a multi-token according to ERC-1155 (see URL eips.ethereum.org/EIPS/eip-1155), or a multi-token set according to ERC-998 (See URL eips.ethereum.org/EIPS/eip-998), and then recorded on the Ethereum blockchain. While Ethereum is referenced as an example, one should appreciate that other forms of notarized ledgers may also be used including, for example, Solana, XPR, Hyperledger, Cardano, etc. Such an approach provides computer-based techniques or methods around creating a market for NFTs representing the actual production of a film or movie. Further, this approach provides for computer-based systems for establishing chain of custody of digital content, verifying digital content, authenticating digital content, conducting transactions associated with digital content, or otherwise managing digital content. Such NFTs can be bound to specific production entities or content creators via, for example, the techniques disclosed in U.S. Pat. No. 11,210,383 to Witchey et al., titled "Content Authentication and Validation via Multi-Factor Digital Tokens, Systems, and Methods," and filed Jun. 28, 2021. This patent is hereby incorporated by reference in its entirety.

Block Diagrams

In FIG. 1, a distributed studio environment 100 according to the principles of the present disclosure is shown. The distributed studio environment 100 (sometimes referred to as an ecosystem 100) includes a content production management system 102, and at least two studios 104A, 104B each having a computing system 120A, 120B, a volume 106A, 106B, a camera 132A, 132B, and one or more controllable devices 134A, 134B. As shown, each computing system 120A, 120B includes a communication interface module 122A, 122B, a control module 124A, 124B, a sensing module 126A, 126B, a control interface module 130A, 130B, a content display interface module 136A, 136B, and computer-readable medium (e.g., memory 138A, 138B). Although the distributed studio environment 100 is presented in one arrangement in FIG. 1, other embodiments may include distributed studio environments arranged otherwise depending on, for example, the number and/or types and/or configurations of studios in connection therewith. For example, one should appreciate that any practical number of the illustrated components may be present.

Once should appreciate many of the various elements within distributed studio environment 100 are computing devices having at least one processor and at least one non-transitory computer readable memory storing software instructions. Further, the various elements can be communicatively coupled via one or more network connections (e.g., wired, wireless, optical, 802.11, cellular network, etc.). Thus, the various elements are able to work together via execution of their respective software instructions. Additionally, one should appreciate a collection of software instructions can comprise one or more applications (e.g., software applications, programs, scripts, apps, adapters, APIs, etc.) distributed among the elements. In some embodiments, the collection of software instructions can comprise a suite of software having individual programs designed to work together. From a hardware perspective, the various elements can comprise client devices, server devices, peer devices, adapter devices, module devices, controller devices, or other types of computing devices forming a platform on which the inventive subject matter is built.

Due to the computer-based nature of the environment 100, technical limitations are imposed on the operation of the environment 100. More specifically, the distributed nature of the environment 100 imposes latency issues, just to name one, among coordination of the various devices in the same studio 104A, 104B, between the different studios 104A, 104B, between one or both studios 104A, 104B and the content production management system 102, etc. As such, to solve such technical limitations associated with latency, the environment 100 is enabled to determine specific latency values among various devices and alter timing of command execution as necessary to ensure the various devices are coordinated, as explained herein. Other computer-related technical limitations imposed on and overcome by the environment 100 may include, for example, bandwidth limitations for transferring large amounts of data (e.g., images, high-res video, etc.), storage of data on storage devices (e.g., SSD, EIDD s, flash, RAM, etc.), indexing or accessing data in the environment 100 or stored on storage devices, or other related issues. As such, the environment 100 is configurable to solve these and other technical limitations through specific and unique interactions, devices, etc., as explained herein.

In the example of FIG. 1, the system 102 and the studios 104A, 104B are remote from each other. For example, the content production management system 102 may be located in New York City, USA, the studio 104A may be located in London, England, and the studio 104B may be located in Los Angeles, USA. While in some embodiments the studios 104A, 104B may be geographically separated (e.g., 10 km, 100 km, 1000 km, or more etc.), the studios 104A, 104B may be separated in time as measured in latency relative to each other or relative to content production management system 102 (e.g., 5 ms, 10 ms, 100 ms, 1000 ms, or more etc.). For example, the studio 104A could be in a physically separated volume from the studio 104B while still being in the same production facility (e.g., in the same production lot, etc.). However, due to networking infrastructure, computer system infrastructure, or other factors, the two studios may be separated in terms of latency even when they are physically close to each other (e.g., less than 10 km, less than 1 km, less than 100 m, etc.). Thus, latency among the distributed devices can create severe coordination issues among the devices as well as providing a seamless integration as a point of coordination; say at a remote facility under control of a director of a film production.

In the particular example of FIG. 1, the volumes 106A, 106B comprise background LED screens or walls. However, it should be appreciated that one or both volumes 106A, 106B may include another suitable type of screens such as a green screen, a blue screen, a curved (or another non-planar) background LED screen, LED ceiling, LED floor, a flat or curved (or another non-planar) foreground screen, etc. The LED screens preferably include one or more computers controlling content displayed on the screens. In more preferred embodiments, the LED display computer operate according to instructions received from one or rendering engines (e.g., Unity®, UnReal®, Blender, etc.). In especially preferred embodiments the rendering engine comprises a game engine; the UnReal® game engine for example.

Figure 6:
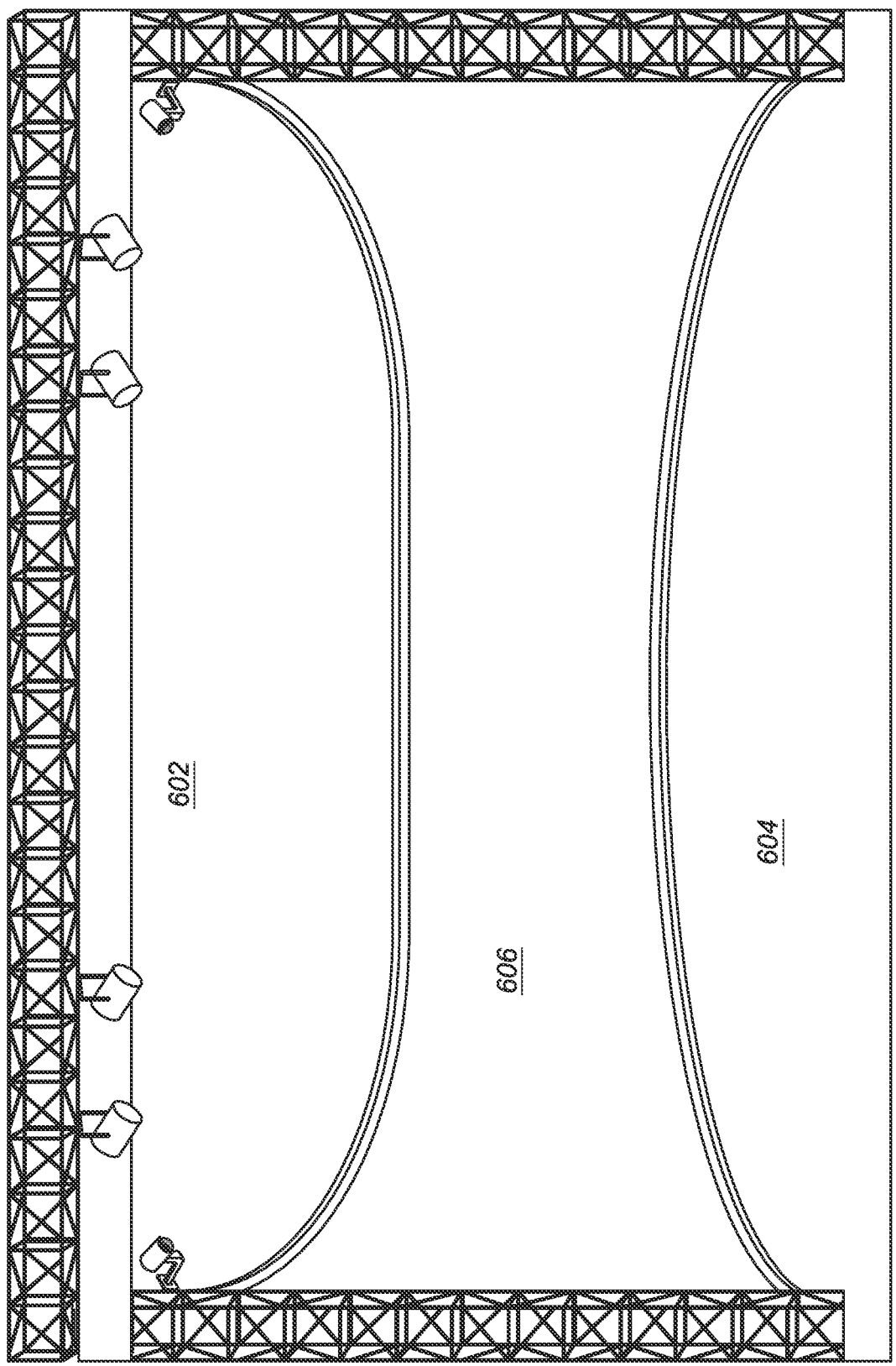
FIG. 6 is a front view of a LED wall according to the principles of the present disclosure.

An example of a LED-based production volume includes NantStudios (see URL www.nantstudios.com), who is a pioneer in the real-world virtualized production via massive LED walls. For example, FIG. 6 illustrates one exemplary LED-based production volume 600 as implemented by NantStudios. As shown, the volume 600 includes a ceiling LED wall 602, a LED stage area (e.g., a floor, a foreground, etc.) 604, and a background LED wall 606. In the illustrated embodiment of FIG. 6, the background LED wall 602 is a curved wall extending between the between the ceiling LED wall 602 and the LED stage area 604. In some embodiments, the LED stage area may be 24,000 sq. ft., and the background LED wall 606 may be 145 ft. long×20 ft. high and may have a volume of 52 ft. wide by 65 ft. long in a 270-degree oval. Alternatively, the LED stage area 604 and the background LED wall 606 may have any other suitable size. Although the LED-based production volume 600 of FIG. 6 is presented and described in one arrangement, other embodiments may include LED-based production volumes arranged otherwise depending on, for example, the number, types, size, configurations, etc. of LED walls, stage areas, etc. in connection therewith.

As shown in FIG. 1, the content production management system 102 includes a communication interface module 108, a command interface module 110, a command queue management module 112, an input device 114, a display module 116, and computer-readable medium (e.g., memory 118). The command interface module 110 and the command queue management module 112 may function similar to the command interface modules and the command queue management modules described herein.

For example, the command interface module 110 may render or otherwise present one or more user interfaces on the display module 116 for content production entities associated with the content production volumes 106A, 106B within the distributed studio environment 100. For example, the command interface module 110 may render a list of commands, updates provided from the one or both studios 104A, 104B, etc. so that an observer (e.g., a director, a producer, etc.) viewing the display module 116 may determine or otherwise respond with a desired course of action (e.g., initiate one or more commands, halt filming, change positions and/or movements of the actors, content and/or devices, etc.).

Additionally, the command interface module 110 may generate commands based on, for example, user input provided on the input device 114 or automatically according to one or more rules systems. For example, the commands generated by the command interface module 110 may be data constructs or objects instantiated in one or more computer readable, non-transitory mediums and function as directives, orders, etc. to instruct or otherwise cause one or more content production entities or their devices to perform specific tasks. In some embodiments, one or more compilers may be employed to compile the commands. For instance, the commands may be initially created in a computer language (e.g., an object-oriented computer language or a non-object-oriented computer language). One or more of the compilers may then compile the commands thereby converting the commands into a machine-readable language. The commands may be compiled at the command interface module 110 and/or at one or both computing systems 120A, 120B. As such, any one (or all) of the command interface module 110 and the computing systems 120A, 120B may include a compiler stored in one or more computer readable, non-transitory mediums (e.g., the memory 118, the memory 138A, the memory 138B, etc.). The commands (before or after being compiled) are transmitted to the command queue management module 112 and then to the studios 104A, 104B via the communication interface module 108 as further explained below.

In some embodiments, the commands may target particular (e.g., target) content production entities or their devices associated with content production volumes 106A, 106B within the distributed studio environment 100. These entities may include, for example, the cameras 132A, 132B, the LED screens, the controllable devices 134A, 134B, computer devices, robots, etc. located in the studios 104A, 104B. In some scenarios, the entities could include humans, in which case the commands may be rendered by a corresponding target device in a manner understandable by humans (e.g., visual cues, audio, text, images, symbols, marks, etc.) as discussed further below.

The command queue management module 112 may receive commands from the command interface module 110 and receive or assign a synchronized execution time to each command. The assigned synchronized execution times may be based on, for example, latency, pace of filming, pace of acting, time related factors, sequencing of commands, other command execution times, etc. as explained herein. For example, latencies among the various devices, the system 102, and/or studios 104A, 104B in the environment 100 may be measured using various techniques including obtaining times via GPS sensors, NTP, ping times, measuring round trip times (RTT) associated with data packets, time to first byte (TTFB), observed human behavior (e.g., based on an observer viewing the display module 116, a previsualization (or previs) 199, or other techniques. In other embodiments, latencies may also be measured based on running one or more simulations or rehearsals to account for human imposed latencies. One should appreciate the execution time for the commands represent when the command should be executed to ensure the resulting actions generate content that will be able to be integrated or observed at a point of use (e.g., at the content production management system 102, the previs 199 associated with the content production management system 102, etc.) at the same time along with content generated from execution of other commends regardless of the physical location where the other commands were executed. Thus, is should be appreciated that each studio may execute local commands out of synch with other studios' local command, but the received content at the point of use appears to be synchronized or at least received according to the requirements of the observer (e.g., the director, the producer, etc.).

Next, the command queue management module 112 may enqueue the commands into command queues associated with the target content production entities (e.g., the cameras 132A, 132B, the LED screens, the controllable devices 134A, 134B, etc.). For example, the module 112 may enqueue the commands into command queues stored in the memory 118. In other examples, the module 112 may enqueue the commands into command queues in another computer-readable medium (e.g., the memory 138A, the memory 138B, etc.) remote from the system 102. In some embodiments, the system 102 and/or the computing systems 120A, 120B may include one or more buffers for temporarily storing commands or command queues to allow for proper enqueueing of commands (or queues) relative to when the commands are generated. For example, if multiple state machines are compiled, their relative commands may be generated and buffered. Then, the commands may be enqueued from the buffers according to their proper execution times.

The command queue management module 112 may then transmit the commands to the studios 104A, 104B via the communication interface module 108. For example, the module 112 may transmit the commands (e.g., individually and/or collectively in one or more command queues) to each control module 124A, 124B. In some examples, the transmitted commands may be stored or buffered in local command queues in the memories 138A, 138B. One should appreciate the commands may be transmitted according to one or more techniques. In some cases, the individual commands are sent to the remote locations for integration into local command queues; in other cases, the corresponding command queues having the commands are transmitted to remote locations; yet in other cases, the remote locations may query command queue management module 112 for commands; and so on.

Figure 2:
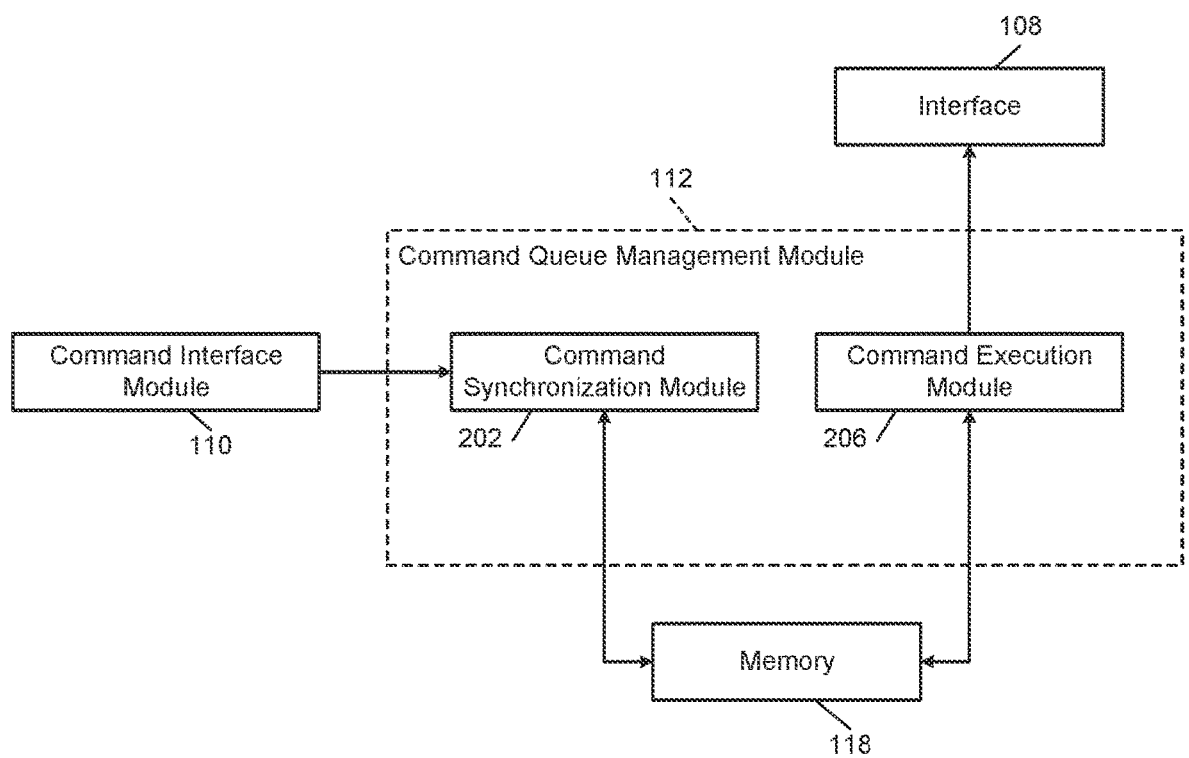
FIG. 2 is a functional block diagram of a command queue management module of the distributed studio environment of FIG. 1, according to the principles of the present disclosure.

The command queue management module 112 may include various components to implement these features. For example, FIG. 2 illustrates one example embodiment of the command queue management module 112 of FIG. 1. As shown, the command queue management module 112 includes a command synchronization module 202 and a command execution module 206. In the example of FIG. 2, the command synchronization module 202 receives commands from the command interface module 110 and assigns synchronized execution times to the commands, where the synchronized execution times preferably comprise a time formatted for local execution (e.g., absolute local time, time relative to other local events, etc.). As discussed previously, execution times may be generated based on, for example, observed conditions including GPS time values, NTP, or other suitable time measuring techniques. The command synchronization module 202 then passes the commands and their synchronized execution times to the memory 118 and enqueues the commands into the command queues stored in the memory 118. The command execution module 206 retrieves the commands and/or the command queues from the memory 118 when appropriate, and transmits the commands (and/or the command queues) to the target content production entities or their corresponding target devices via the communication interface module 108, as explained herein. The number of command queues can vary depending on circumstances, configurations, or other factors. Thus, there could be one, two, 20, 100, 1000, or more command queues under management. Further each command queue can comprise one, two, 20, 100, 1000, or more commands as required by the complexity of a production event or required by corresponding state machines.

Referring back to FIG. 1, each computing system 120A, 120B is in communication with each other and with the content production management system 102. For example, the communication interface module 122A of the computing system 120A provides bidirectional communication (e.g., receiving data, and sending data and transmitting data) with the computing system 120B and the content production management system 102 (via the communication interface module 108), and the communication interface module 122B of the computing system 120B provides bidirectional communication (e.g., receiving, sending and transmitting data) with the computing system 120A and the content production management system 102 (via the communication interface module 108). Communication interface module 108, as with other communication interface modules within the ecosystem 100, can include interfaces for wired or wireless connectivity: Ethernet, USB, RS-232, 802.11, Bluetooth, WiGIG, IrDA, cellular modem, radio, or other type of communication connectivity interfaces.

In the example of FIG. 1, each sensing module 126A, 126B receives data from one or more sensors 128A, 128B located in its respective studio 104A, 104B. For example, the sensors 128A, 128B may provide data relating to the lighting characteristics, sound characteristics, prop locations, camera positions, etc. in the studios 104A, 104B. The received data from the sensors 128A, 128B may be passed to the content production management system 102 via the control modules 124A, 124B and the communication interface modules 122A, 122B.

The command interface module 110 may generate at least some of the commands based on the received data from the sensors 128A, 128B to make desired adjustments (e.g., real-time adjustments) to lighting systems, sound systems, the cameras 132A, 132B, rendered content of the volumes 106A, 106B, actors, prop locations, etc. in the studios 104A, 104B. These commands may be generated automatically (e.g., based on defined events, etc.), in response to user input from one of more stakeholders, etc. The commands (e.g., individually and/or collectively in command queues) may be transmitted to the computing systems 120A, 120B, as explained above. Further, commands in the command queues may also include triggering conditions based on, for example, observed sensor data. Thus, such commands might include additional execution requirements beyond execution times. For example, a command may be queued for a range of acceptable execution times as well as based on when specific sensor data is observed (e.g., an actor moves, a prop moves, someone speaks, etc.).

The control modules 124A, 124B may distribute the transmitted commands to various target content production entities or their corresponding target devices. For example, the control modules 124A, 124B may distribute the transmitted commands to the cameras 132A, 132B, the LED screens in the volumes 106A, 106B, the controllable devices 134A, 134B, and/or other target content production entities in the studios 104A, 104B via the control interface module 130A, 130B. The commands may then be executed by the corresponding entity (e.g., devices, etc.) according to their synchronized execution times, spread of execution times, or other triggering criteria. In some examples, the commands may be executed only after the entities are enabled to do so (e.g., by enablement signals received from the command queue management module 112). Thus, in some embodiments, commands may be triggered based on satisfaction of multiple factors defining a command triggering criteria (e.g., time, other commands, audio triggers, computer vision recognition, other sensor data, previs instructions, etc.).

The controllable devices 134A, 134B may include any suitable target content production entity. For example, the controllable devices 134A, 134B may include props such as a vehicle, a robot, etc.; production equipment such as cameras, light systems, sound systems, sensors, movable platforms, moveable walls, LED walls, LED ceilings, LED floors, gimbals, display modules, etc., and user devices such as personal computing devices (e.g., smartphones, smartwatches, smart glasses, tablets, laptops, etc.).

In the example of FIG. 1, the control modules 124A, 124B render content on the LED screens via the content display interface modules 136A, 136B, respectively. The rendered content may be adjusted, updated, etc. as necessary based on, for example, generated commands as explained above.

The rendered content (including adjusted and/or updated content) may be the same or different for the studios 104A, 104B. For example, both LED screens in the volumes 106A, 106B may display the same content (e.g., a landscape background with a prop such as a star 142A). In such examples, the camera 132A may film the rendered content with an actor 140A performing in the volume 106A, and the camera 132B may film the same rendered content with actors 144B, 146B performing in the volume 106B. In some examples, any one of the actors 140A, 140B, 144B, 146B may be a physical actor, a virtual actor that is part of the rendered content, etc.

In other examples, the LED screens in the volumes 106A, 106B may display different content. For example, the LED screen in the volume 106A may display a landscape background with the star 142A, and the LED screen in the volume 106B may display a foreground (without the star 142B). While the content displayed on different LED screens may be different from each other, it should be appreciated the different content can still be part of the same content production effort. Thus, the different content as captured by different cameras may be transmitted back to content product management system 102 for integration or other uses.

In some examples, the captured film from the studio 104A may be passed to the studio 104B as a possible input for control purposes. For example, one of the cameras 132A, 132B may be driven based on input from the other camera 132A, 132B. For instance, the camera 132A (e.g., a slave camera) may be mechanically driven based on input from the camera 132B (e.g., a main camera) such that the camera 132A moves during a scene in coordination with, relative to, etc. the camera 132B. In such examples, the captured content (including the actor 140A and/or the star 142A) from the camera 132A may be transmitted to the content display interface module 136B, the camera 132B, the control module 124B, etc. and added to the final rendering, rendered onto the LED wall in the volume 106B (via the content display interface module 136B), etc. In some embodiments, the captured content from the camera 132A of the studio 104A may be stored or buffered in the memory 138B of the studio 104B.

When a content display interface module generates a background for a volume that includes captured content from a camera, it may adjust the captured content to ensure that the necessary visual information will be displayed correctly on the volume's LED panels per corresponding commands. Such adjustment commands may include scaling the captured content to match the scale relatively to the actors or props taking into consideration of the view of the local camera; rotating and skewing the captured content to match the horizon of the volume and the local cameras capturing the content; making sure that all actors are up right, adjust lighting, color, adjust the captured content's exposure and contrast to match current volume so that the captured content does not look out of place; moving the content to make sure the content is not floating in space, stuck in the floor or is too far to the side to be captured properly; or verifying that the content placement matches the previs (previsualization), script, or story board for the scene.

For instance, in FIG. 1, to render location B's volume 106B the content display interface module 136B receives captured content from location A's volume 106A via the interface modules 122A, 122B and the control modules 1241, 124B. The content display interface module 136B moves the captured actor 140A to the planned previs placements as defined for the scene. These example placements are shown at the previs 199, where one actor's location is depicted at 140C, the star's location is depicted at 142C, another actor's location is depicted at 144C, and another actor's location is depicted at 146C.

The location of actor 140A in the scene is adjusted to match the previs, otherwise the actor 140A captured from location A may be projected or rendered behind actor 146B on the LED panel might not match the previs 199. Once the captured content is placed in its final position for filming, it may be rotated and to match location B's volume 106B based on the camera's 132B position and orientation capturing the scene, it may have its lighting, color, contrast and brightness adjusted to match volume B 106B, and may have any additional visual effects added to be render with all other content onto the LED panels filming can begin in volume B 106B.

The process of taking the captured content and tracking items (e.g., cameras, lights, light sensors, other sensors, microphones, actors, props, etc.) to render the LED panels of the volumes 106A, 106B may be done semi-manually with some input from a person, for example, from the ingestion of the previs 199, a script, one or more state machines, or other choreography document. The content display interface module adjusts the captured content, with the help of a rendering engine, placing and performing required steps using the coordinates and orientation of the captured content (e.g., microphones, camera, actors, props, lights, light sensors, other sensors, movement, LED wall display, etc.) at location A relative to the camera 132A at location A and using the coordinates and orientation of all items at location B relative to the camera 132B at location B. This can be accomplished automatically by using 3D math (e.g., polar coordinates, Euler angles, quaternions, etc.), artificial intelligence (e.g., neural networks, classifiers, etc.), voice/audio recognition, computer vision (e.g., gesture recognition, edge detection, face detection, Facial Expression Recognition, silhouette detection, motion detection, activity detection, object recognition, object tracking, eye tracking, items classification, 3D reconstruction, blob detection, pattern recognition, segmentation, etc.) and capture data (e.g., the audio data, the image data, the orientation data, the coordinate data, the settings data, the tracking data, etc.) for all items in the volume (e.g., microphones, cameras, actors, props, lights, light sensors, extras, staff, etc.).

Example techniques regarding using computer-based recognition techniques are described in U.S. Pat. No. 10,540,772 to Wnuk, titled "Feature Trackability Ranking, Systems and Methods," and filed on Feb. 25, 2019; U.S. Pat. No. 10,346,712 to Siddiqui, titled "Metric-Based Recognition, Systems and Methods," and filed Oct. 5, 2018; U.S. Pat. No. 10,410,088 to Wnuk et al., titled "Invariant-Based Dimensional Reduction of Object Recognition Features, Systems and Methods," and filed Sep. 15, 2017; U.S. Pat. No. 10,572,724 to Wnuk et al., titled "Activity Recognition Systems and Methods," and filed Feb. 25, 2019; U.S. Pat. No. 10,719,731 to Song et al., titled "Robust Feature Identification for Image-Based Object Recognition," and filed Jun. 24, 2019; and U.S. Pat. No. 10,229,342 to Song et al., titled "Image-Based Feature Detection Using Edge Vectors," and filed Dec. 15, 2017. The above patents are hereby incorporated by reference in their entirety.

Using the captured data, the system (e.g., content production management system 102, control modules 124A or 124B, etc.) can direct, via commands executed on corresponding target devices, actors, staff, extras, microphones, cameras, lights, light sensors, and LED panels at each location. Additionally, the system can leverage audio cues and/or visual cues to capture one or more of the following: displaying direction for actors on a screen; creating or lighting up arrows; turning on lights; turning off lights; providing audio instructions to actors/extras/camera operators; providing haptic feedback; displaying direction to staff; generating VFX on LED panels, etc. The corresponding commands for such cues can be timed to account for latency created by one or more of the following: latency of sending information; network latency; latency rendering content on LED panels; human latency due to reaction times relative to receiving instructions; latency for movement of the camera; latency for camera acceleration; latency from repositioning captured content on other or secondary volumes and their corresponding LED panels; planned latency as defined in a script or previs; or other sources of latency. The system may be configured to receive the required information (e.g., a script including the lines for the actors, the sounds that will be present at the locations, the previs images for the scenes, actors and their outfits for each location, anticipated movement of the actors in the scenes, location of props, or more) to generate the estimated timing for execution of commands to manage a shoot, as well as the timing for the commands for the various types of cues that would be needed for humans involved, and to create a list of events and their timing for filming in the various volumes. The system may start processes or render cues upon an appropriate trigger (e.g., as soon as the director says action, etc.), and can continue preforming actions via execution of the command largely if not completely autonomously. The system can cue each actor, extras, support staff, or other human while it also manages the rendering system, the lights, the cameras or other devices. Further, the system can adjust the shoot timing based on estimated latencies, and adjust timings during a shoot based on actual observed latencies by passing latency information to other location that are involved the filming.

The pace or rate of a content production effort can be tracked in real-time as its actors perform their required scenes. For example, a script can be compiled down to one or more expected observations as well as expected actions that should take place in response to command execution. For instance, each studio and each scene can have a corresponding one or more state machines, where each state has a set of commands to execute and each transition comprises expected actions or observations that should be present before transitioning to the new state. The compiled script can then be translated, possibly via the command interface module 110, into commands, which are then placed in corresponding queues. The content production management system 102, or other suitably enabled devices, may use computer voice recognition or audio recognition algorithms executed on one or more processors to observe the pace of the shoot or the timing required for the various commands, including cueing actors, moving cameras, triggering events, rendering visual effects, rendering content on LED panels, adjusting microphone inputs, moving vehicle, adjusting lights, providing instructions to extras and staff at various locations to assure precise or accurate timing across the volumes in the ecosystem. The content production system 102 or other devices within the system may also use computer vision algorithms to recognize actors, their gestures (see, e.g., U.S. Pat. No. 10,572,724 referenced above), the direction they are facing, their location in the volume, their facial expressions to determine where in the script they are, or to adjust some or all of the timings or cues as needed based on this information. Further the devices in the ecosystem may be enabled to move cameras to ensure that shots are captured as specified by the director, script, previs, or other production authorities. For example, when the scene being captured is observed to be proceeding at a slower or faster pace than expected, the commands in the command queues can have their execution times altered to slow the pace of other volumes involved in the shooting or accelerate filing as required.

In some embodiments, commands may also include one or more execution priority values. For example, each command may include a specific priority value selected from multiple priority values. The priority values may include, for example, a numerical range, an alphabetic range, or another suitable range of values to place an order of importance on commands relative to other commands. For instance, one command A may include a priority value of 1 and another command B may include a priority value of 5 signifying that the command B is less important than the command A. Thus, should production slow down, commands with low execution priority values (e.g., command B above) could be dropped from execution to ensure the production returns to expected timing. Such embodiments provide for creating "good enough" productions, possibly as part of a rehearsal or as part of a director's set of optional actions.

In some embodiments, cues may be a very important part of producing content in a controlled or managed scene, and the content management system may leverage many types of cues or technologies to provide such cues. Non-audio cues may be important for actors and extras that are being filmed as audio cues may not be possible due to interfering with the spoken lines in the script. Further, using earpieces for audio may be visible on camera, which is not desirable. Audio cues; however, may be used for extras, camera operators, or staff. Thus, for actors visual or haptic cues are more suitable. For example, visual cues may be rendered or presented according to one or more commands on LED displays in a large 3D LED paneled volume (e.g., the volume 106A and/or the volume 106B). Thus, an actor is able to look in nearly any direction and see the cues displayed or rendered, and possibly read messages displayed as part of the cue. Such messages can be placed strategically according to the corresponding command parameters to cause the actor look in a specific direction allowing the camera to capture a desirable shot, where the camera in pointed in a direction such that the visual queue rendered on a LED is not visible. Still further, the cues may be generated via haptic devices, possibly tiny devices in the actor's clothes, which can signal to the actor to move in a direction or to stop. Such tiny electronic devices (e.g., Yost LABS 3-space Mini Bluetooth, etc.) or smart clothing (e.g., TactSuit, Woojer Vest, Tesla-Suit: see URL teslasuit.io etc.) provide for a content display interface module (e.g., the display interface module 136A and/or the display interface module 136B) to communicate with all actors to reduce the number of retakes.

Other cues for devices (e.g., cameras, robots, vehicles, etc.) may require additional considerations when forming corresponding commands. For example, camera commands might include movements to prepare the camera before filming. Thus, a command used to generate a camera cue may need to account for additional time to start moving the camera before, during, or after a shoot, while accounting for the camera's acceleration (or other higher order derivatives of movement) as part of a latency for the corresponding command. More specifically, cameras or other equipment may need time to accelerate to a specific speed or velocity as it is not always possible for equipment to be instantaneously at the right position or instantaneously have the desired movement parameters. The motion of cameras as well as other props (e.g., vehicles, robots, environmental objects such as swings, or swaying trees, etc.) may also require time in order to get into proper motion, where the required time can increase the expected latency of a corresponding command. One should appreciate that motion, in many scenarios, may not be linear, which can alter how commands are triggered. Said in a different manner, the execution times of commands may be calculated using non-linear formulas such as acceleration or other higher order derivatives (e.g., $d^3x/dt^3$, $d^4x/dt^4$, etc.). Of particular interest, props, cameras or actors may be tilted, moved on trucks, pedestals, etc. as desired to match the seven basic movements of the camera (i.e., zoom, pan, tilt, dolly, truck, pedestal, and rack focus) as some studios may not have the space to track the camera outside of the volume forcing the movement of the actors and props.

The captured digital content (e.g., film, audio, stills, etc.) from one or both studios 104A, 104B may be transmitted to the content production management system 102 and/or another location. The captured film from both studios 104A, 104B may then be combined, integrated, or otherwise managed as explained herein. For example, the captured film from both studios 104A, 104B may be combined using computer vision algorithms based on feature tracking or stitching content together based on identified features (e.g., scale-invariant feature transform (SIFT) algorithms, speeded-up robust features (SURF) algorithms, FAST Features from Accelerated Segment Test, BRIEF Binary Independent Elementary Features, ORB Object FAST and Rotated BRIEF, Canny Operator, Canny edge detector, etc.). Such vision algorithms, packages or APIs (e.g., Microsoft Computer vision, AWS Rekognition, Google Cloud Vision, IBM Watson, Cloud Sight, ClarifaiV2, Kairos, EmoVu, ImageVision, Animetrics, NANT's iD platform API, OpenCV, etc.) may configure components to track backgrounds and separate real actors and props from the background based on a priori identified tracking features (see, e.g., U.S. Pat. No. 10,540,772 referenced above). At such points, the background can be upgraded to a higher resolution if desired. This may be done, for example, in real-time based on the coordinates of the camera. In some examples, the stakeholder (e.g., a director, etc.) may zoom out further than what the cameras captured because the coordinates may be used to generate the needed environment. The content production management system 102, among other devices in the ecosystem, may be configured via software instructions to modify the way the film is combined or integrated from the different volumes. Such adjustments can be small such as adjusting the relative lighting to more significant changes such as removing objects from the digital content obtained from a volume (e.g., removing the duplicated star 142A and just leaving the star 142B star or vice versa), or moving the actor 140B to the left or right to make the actors appear as if they are aligning themselves with either one of the two actors 144B, 146B. In view of this approach, via the coordinated, distribute command queues, post-production may be reduced because integration occurs in near real time during production. The technical advantages are clear. The disclosed approach provides for computer-based techniques leveraging distributed command queues, and possibly computer vision systems to reduce tracking timing, location, or orientation of objects in distributed volumes. The result is that the content production management system 102 achieves a more realistic production available to a remote director or other stakeholder where the production will require less post-production work. Examples of techniques for rendering disparate streams of content at a local point of use that may be adapted for using with the inventive subject matter includes those disclosed in U.S. Patent Publication 2021/0304418 to Soon-Shiong, titled "Digital Representation of Multi-Sensor Data Stream," filed Mar. 31, 2021, and hereby incorporated by reference in its entirety. For example, content generated from execution of the synchronized commands may be placed in buffer queues in preparation for synchronized rendering of at the point of use.

Flow Charts

Figure 3:
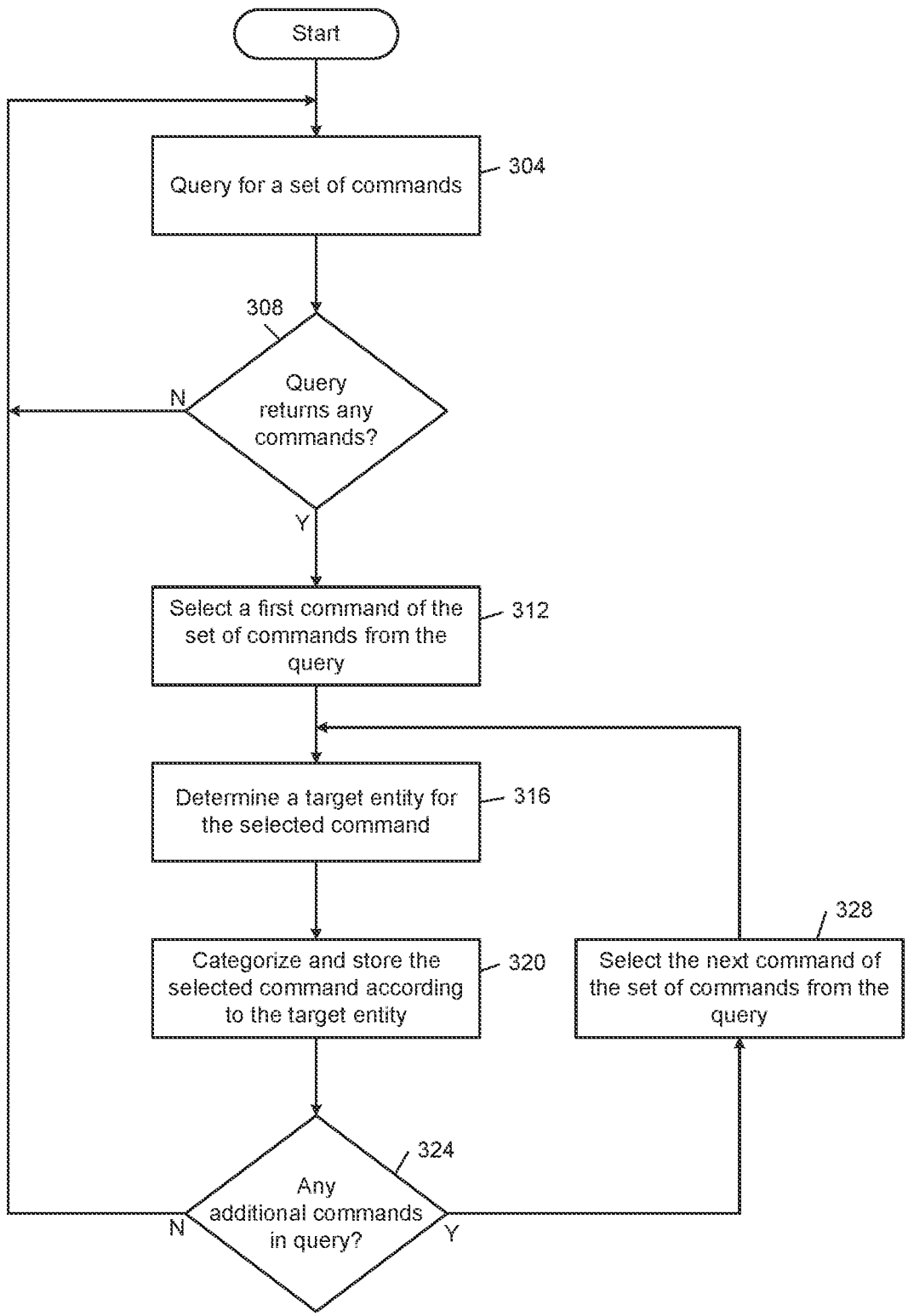
FIG. 3 is a flowchart of an example operation of categorizing commands in a distributed studio environment according to the principles of the present disclosure.

In FIG. 3, an example command categorization operation is shown. The command categorization operation may be implemented in, for example, a command queue management module (e.g., the command queue management module 112 of FIGS. 1 and 2) of a content production management system, among other devices. In other embodiments, the command categorization operation of FIG. 3 may be implemented in, for example, a computing system associated with a studio (e.g., one or both computing systems 120A, 120B associated with the studios 104A, 104B of FIG. 1). In yet other embodiments, one or more steps of the command categorization operation may be implemented in the command queue management module (e.g., the command queue management module 112 of FIGS. 1 and 2) and one or more other steps of the command categorization operation may be implemented in a computing system associated with a studio (e.g., one or both computing systems 120A, 120B associated with the studios 104A, 104B of FIG. 1).

Control begins at 304, where control queries for a set of commands. The query for the set of commands at 304 may be implemented via, for example, the command queue management module 112 and/or one or both computing systems 120A, 120B of FIG. 1. For example, one or more commands may be generated by a command interface module based on input from a stakeholder or other sources, as explained herein. The generated commands may be stored or buffered, for example, in one or more data structures such as command queues or databases of one or more computer readable, non-transitory mediums (e.g., the memory 118 associated with the content production management system 102 of FIG. 1) as explained herein. In other embodiments, the generated commands (individually or collectively) may be transmitted to one or more remote locations (e.g., to the computing systems 120A, 120B of FIG. 1) and then stored or buffered in one or more data structures of one or more computer readable, non-transitory mediums (e.g., the memory 138A, the memory 138B, etc. associated with the computing systems 120A, 120B of FIG. 1, etc.) as explained herein. The set of commands may then be retrieved from the one or mor data structures through a request or query implemented by, for example, the command queue management module 112, the control module 124A, the control module 124B, etc. of FIG. 1 depending on where the commands are stored or buffered. In some embodiments, the command queues or databases may be queried using keywords, SQL queries, attributes, or other techniques.

Next, control proceeds to 308, where control determines whether the query returned any commands. If no, control returns to 304; otherwise, control proceeds to 312. At 312, control selects a command (e.g., a first command) of the set of commands. While a stakeholder, possibly a director, may provide input related to commands, it should be understood commands can also originate from computing devices in the ecosystem. For example, in some embodiments, commands may be generated via a computer enabled with software instructions capable of understanding a script (e.g., OCR, script compiler, etc.), a previs (previsualization) compilation, a state machine management module, a rendering engine, or other types of management systems. The computer may then convert such information to one or more commands targeting specific target devices at specific locations in various volumes. A command may include numerous features to facilitate production. As discussed, the command may target a specific entity. Further a command may include multiple instructions, which can be encoded in machine understandable format (e.g., scripts, compiled object code, XML or JSON encoded instructions, etc.), by which a target device (or suitable adapter) may execute the command instructions. Commands may also include attributes (e.g., metadata, attribute-value pairs, etc.), priority values, keywords, etc. that describe the nature of the command and which may alter the command behavior or be used for the basis of a query. For example, a command may include a specific attribute and a priority value to signify the purpose of the command and its importance relative to other commands. Additionally, commands may include execution times (e.g., absolute time, relative time, local time, execution time tolerances, etc.), which aid in ensuring all commands execute at their appropriate times relative to each other. In addition to execution times, commands may include one or more additional triggering criterion that can include required conditions or optional conditions that should be satisfied before the command is to be executed. For example, in addition to a specific time, a command might also require that an actor be at a specific location within a volume (e.g., in a specific voxel, etc.) before the command executes (e.g., setting off a VFX explosion, initiating a camera movement, causing a prop to move, etc.).

Next, at 316, control determines a target content production entity for the selected command. For example, control may determine the target content production entity based on input from the stakeholder, what the command is instructing someone/something to do, etc. With respect to a script, an entity may be identified by character names or set direction. Further, in some embodiments, the various entities may be identified via a digital story board showing specific characters, desired camera positions (e.g., coordinates, camera identifiers, etc.), props, or other entities associated with the production. After the target content production entity is determined, control proceeds to 320.

At 320, control categorizes and stores the selected command according to the determined target content production entity. For example, if control determines the target content production entity for the command is a movable platform, control may categorize (e.g., label, etc.) the command accordingly and store the command in a command queue associated with the movable platform. In some embodiments, the categorized command may be stored along with other related commands so that the commands are part of a state of a state machine associated with a remote studio, a scene filmed at a remote studio, an overall production, etc. as explain herein. Control then proceeds to 324.

The corresponding command queue may be local to the content production management system or could be stored remotely, at one of the remote studio locations, or even stored in buffer in preparation for use, for example. In some embodiments, the command queue may be stored in a specific device's memory, which may be the target entity of the command. Command queues can be implemented as a data structure where commands are ordered according to one or more command attributes (e.g., execution times, triggering criteria, etc.). Example acceptable data structures may include linked lists, queues, dequeues, vectors, maps, trees, or other data types just to name a few. For small devices that may have minimal memory, devices may be equipped with an adapter, a device having a larger memory that communicatively couples with the small device, and which may store the command queue. The adapter may then submit commands to the small device for execution. Such adapters are sometimes referred to as device servers having network interfaces exposed external to the small device and an interface for the small device (e.g., RS-232, USB, etc.). Example device server products include those offered by Lantronix®, Digi International®, or Moxa®, or possibly implemented using off the shelf hardware such as the Raspberry PI or implemented using a proprietary device.

At 324, control determines whether the query returned any additional commands. If no, control returns to 304; otherwise, control proceeds to 328. At 328, control selects the next command (e.g., a second command) from the query. Control then returns to 316, where control determines a target content production entity for the selected command as explained above.

Figure 4:
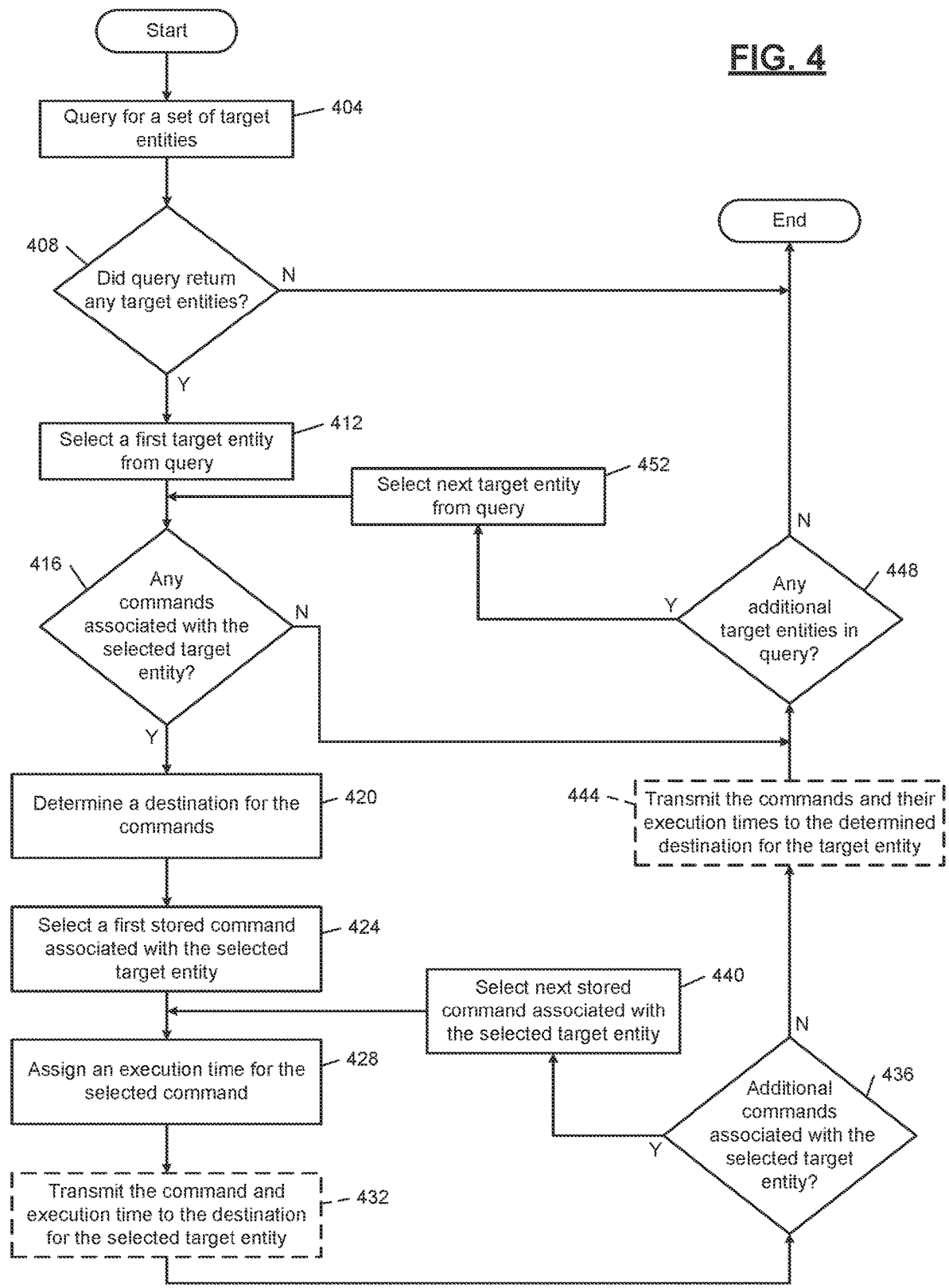
FIG. 4 is a flowchart of an example operation of assigning execution times for commands in a distributed studio environment according to the principles of the present disclosure.

In FIG. 4, an example operation for assigning execution times of commands is shown. The example operation of FIG. 4 may be implemented in, for example, a command queue management module (e.g., the command queue management module 112 of FIG. 1) of a content production management system, among other suitably enabled devices. The control elements of FIG. 4 may be re-ordered to suit a specific implementation. For example, commands may be generated before obtaining a set of target entities.

Control begins at 404, where control queries for a set of target content production entities (e.g., devices, camera, equipment, actors, robots, etc.). For example, target content production entities located at different (and sometimes remote) studios may be known or identified by the content production management system. In some embodiments, one or more databases may store a set of potential entities and/or their corresponding target devices, possibly indexed by their capability or feature attributes. An entity database may be populated from entities inferred from a script, a previs, or other sources that may outline a set of entity requirements (e.g., defined in JSON file, listed in a table, etc.). Further, each site may have their own entity database, which may facilitate non-affiliated studios working with each other. The entity databases may be queried using keywords, SQL queries, attributes, or other techniques. The entities in the databases may be tagged with or indexed by relevant attributes to enable search. For example, entities may be tagged with attributes including location, capabilities, relevant script or scene information, costs to use, or other types of information. Cost to use information provides for a production studio to track use by third parties for billing purposes. One aspect of the present disclosure is considered to include providing auditing or invoicing services based on allocation or use of production equipment as evidenced by corresponding execution command.

Control then proceeds to 408, where control determines whether the query returned any target content production entities. If no, control ends; otherwise, control proceeds to 412. At 412, control selects a target content production entity (e.g., a first target content production entity) of the set of target content production entities from the query.

Next, at 416, control determines whether any commands are associated with the selected target entity. For example, each command may be categorized and stored in a command queue associated with a particular target entity, as explained above. Commands may be determined based on the capabilities of an entity. Consider a scenario where an entity is tagged with or comprises an exposed API. The API may be represented via a mark-up language (e.g., XML, JSON, YAML, etc.), from which commands may be drawn or otherwise identified. As such, control may access one or more command queues associated with the selected target entity, and may determine if any commands are stored in the command queue. If yes at 416, control proceeds to 420; otherwise, control proceeds to 448.

At 420, control determines a destination for the commands associated with the selected target entity. For example, control may determine an IP address, a particular network endpoint, a location ID, a volume ID, a voxel ID, a camera capturing ID, a URL, a UUID, a GUID, and/or another identifying maker associated with the selected target entity. In some embodiments, the destination of the commands may include addresses that adhere to a hierarchical structure. For example, an address might be structured in a manner similar to: <studio>.<volume>.<device>.<queue> where "studio" represents a studio identifier or name, "volume" identifies a specific filming volume within the studio, "device" represents a specific device identifier (e.g., a MAC address, a UUID, a GUID, an IP address, etc.) and "queue" could be used to represent a specific command queue within or associated with the device.

Control then proceeds to 424. At 424, control selects a stored command (e.g., a first stored command) associated with the selected target entity. Next, at 428, control assigns a synchronized execution time, or other triggering conditions, for the selected command. For example, control may assign a synchronized execution time for the selected command based on, for example, latency, time related factors, sequencing of commands, other command execution times, etc., as explained herein. The synchronized execution time for the command can be an absolute time (e.g., a globally determined time, a local time, etc.), a relative time, or a combination of both. For example, if the command for the selected target entity is dependent on one or more other entities, a relative execution time may be a relative time in relation to the other entities completing their command and may be adjusted to trigger a relative time after those entities complete their command. Thus, as previously discussed, execution criteria for a command may depend on additional factors beyond time. Additionally, if the system fails to detect the completion of the commands by the other entities within a specified time, the system may have a fallback absolute synchronization execution time that will be used in that case to execute the command. Execution times may take into account communication or network latency among the various device or studios in the ecosystem, where latency can be measured using various techniques including obtaining times via GPS sensors, NTP, ping times, measuring round trip times (RTT), time to first byte (TTFB), or other techniques. Individual latencies may be added (or subtracted) to arrive at an execution time. When the execution time is determined, it preferably accounts for where or when the corresponding capture digital content is to be presented or otherwise observed. Thus, in cases where a stakeholder (e.g., a director, producer, etc.) is remote relative to the distributed studios and the content is to be presented to the stakeholder, then the latencies used to calculate the execution times would likely be relative to the stakeholder's computing devices and the remote devices. Latencies may also be measured based on running one or more simulations or rehearsals to account for human imposed latencies.

Control then proceeds to 432. At 432, control optionally transmits the command, possibly over a network, and its execution time to the destination for the selected target entity. In such examples, the command is individually passed to the selected target entity or a target device. Commands may be packaged as a serialized object (e.g., binary, XML, JSON, YAML, etc.) and transmitted via one or more protocols (e.g., HTTP, SSL, TCP/IP, UDP/IP, etc.).

Control then proceeds to 436. At 436, control determines whether any additional commands are associated with the selected target entity. If yes, control proceeds to 440; otherwise, control proceeds to 444. At 440, control selects the next stored command (e.g., a second stored command) associated with the selected target entity. Control then returns to 428 to assign a synchronized execution time for the selected command.

At 444, control optionally transmits all of the commands associated with the selected target entity and their execution times to the destination for the selected target entity. In such examples, the commands may be collectively passed to the selected target entity. In some examples, a command queue with all of the commands stored therein may be passed to the selected target entity. As with commands, a command queue can be packaged or otherwise serialized for transmission over a network. Control then proceeds to 448.

At 448, control determines whether the query returned any additional target content production entities. If no, control ends; otherwise, control proceeds to 452. At 452, control selects the next target content production entity (e.g., a second target content production entity) of the set of target content production entities from the query. Control then returns to 416.

Figure 5:
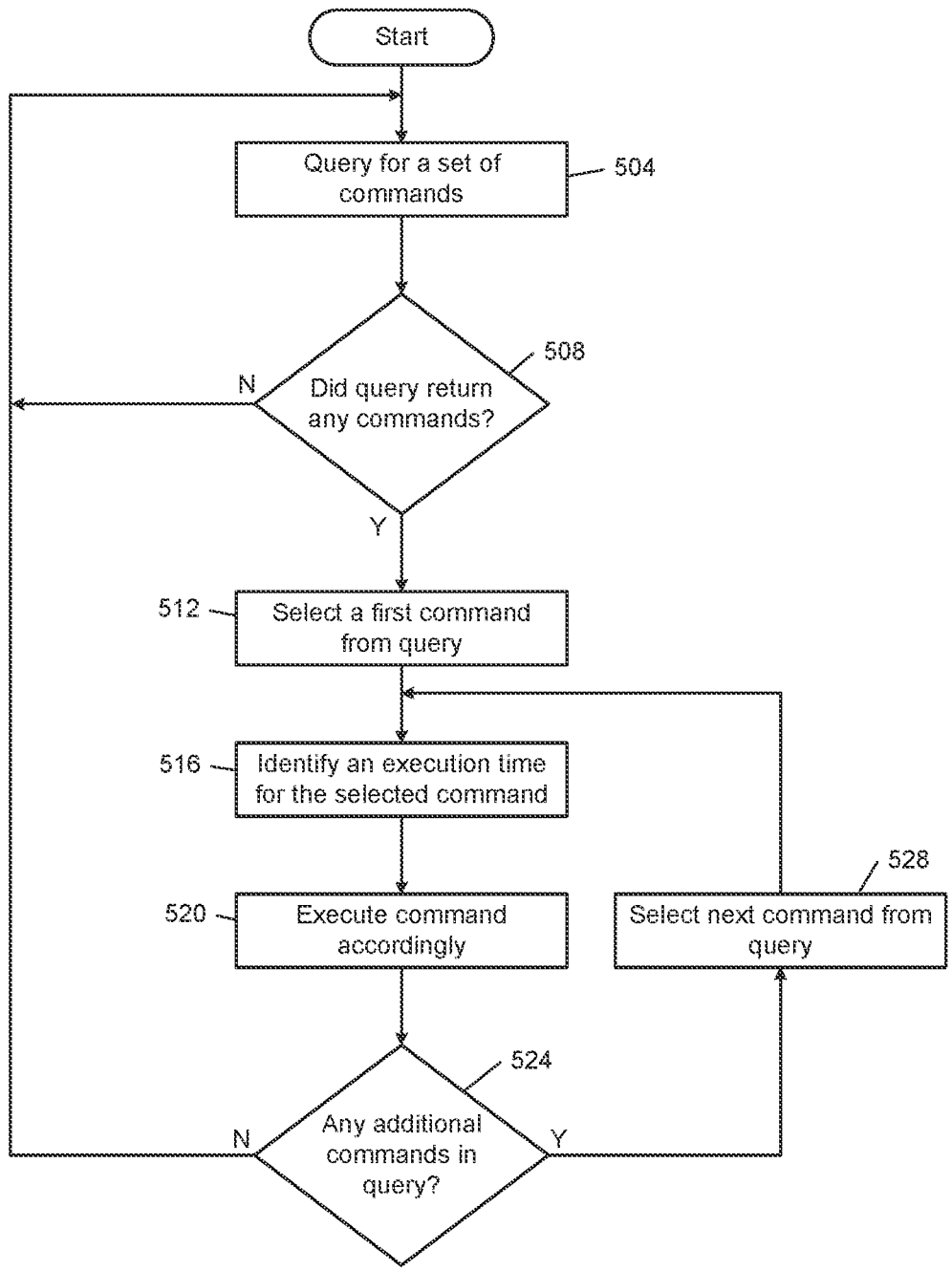
FIG. 5 is a flowchart of an example operation of executing commands in a distributed studio environment according to the principles of the present disclosure.

In FIG. 5, an example command execution operation is shown. The example command execution operation of FIG. 5 may be implemented at, for example, a remote studio. For example, the command execution operation may be implemented with a control module located at the remote studio, with processor hardware associated with a target content production entity at the remote studio, etc. In cases where the target entity is a device (e.g., a camera, a device adapter, etc.), the device may execute the command directly. In cases where the target entity includes a human, a corresponding target computing device may present the command (e.g., a cue, a prompt, etc.) to the human. Such commands may comprise visual commands (e.g., rendered on a display, etc.), an audio command, a haptic command, or other modalities that a human can observe. Such commands or cues can be, for example, rendered on a LED wall within the view of the human, but outside the field of view for the camera.

Control begins at 504, where control queries for a set of commands. For example, commands received from a content production management system may be stored in local and/or remote memory associated with the control module, the target content production entity, etc. For example, a command may be popped off (i.e., dequeued) the front a corresponding queue. Next, control proceeds to 508, where control determines whether the query returned any commands. If no, control returns to 504; otherwise, control proceeds to 512. At 512, control selects a command (e.g., a first command) of the set of commands from the query. The results of execution can be, for example, archived, possibly as an NFT or data on a notarized ledger, possibly for future use (e.g., auditing, invoicing, machine learning training data, review, etc.).

Next, at 516, control identifies an execution time for the selected command. For example, the execution time for the selected command may be previously assigned and stored in local and/or remote memory associated with the control module, the target content production entity, etc. Each executing device may have access to a clock (e.g., GPS, internal clock, NTP, etc.) by which it monitors a current time, possibly a globally synchronized time. When a command's execution time arrives, as well as when other triggering criteria are satisfied, the device executes the command. Control then proceeds to 520, where control executes the selected command according to its execution time. Control then proceeds to 524

At 524, control determines whether the query returned any additional commands. If no, control returns to 504; otherwise, control proceeds to 528. At 528, control selects the next command (e.g., a second command) of the set of commands from the query. Control then returns to 516 to identify an execution time for the selected command.

Additional Considerations

The previous discussion presented the inventive subject matter mainly in the context of a distributed studio environment. In addition to the above, the following points expand on embodiments of the subject matter or provide additional details regarding the inventive subject matter.

In view of the disclosed ecosystem comprising multiple facilities and devices distributed over geographic distances, the content production management system may provide network management capabilities to ensure all devices, regardless of location, are able to communicate with each other efficiently. One aspect of network management includes managing latency among the interconnected devices. As discussed previously, latency may be measured between at least two device using empirical techniques. In addition to measuring latency, some embodiments provide for configuring or otherwise provisioning the network(s) connecting the devices to have a desired latency or other level of service. Example techniques that may be adapted for provisioning the networks are described in U.S. Pat. No. 9,917,728 to Wittenschlaeger, titled "Software-Enabled Fabric Enablement," and filed Jan. 13, 2015; and U.S. Pat. No. 10,826,796 to Charnock et al., titled "Virtual Circuits in Cloud Networks," and filed Sep. 26, 2017. These patents are hereby incorporated by reference in their entirety. For example, the content production management system may be configured to have a latency threshold that should not be exceeded (e.g., no more than 100 ms, no more than 500 ms, etc.). In response to such a configuration parameter, the content production management system may select network channels, possibly down to a specific wavelength of light on an optic fiber, capable of delivering the required level of latency service. The selected channels may then be dedicated to the production effort, possibly for a specified or leased amount of time. Thus, one aspect of the inventive subject matter is to determine an execution time for a command based on a provisioned network latency between at least two devices.

Beyond latency management, there are other aspects of network management that may figure heavily in the disclosed ecosystem. Additional areas of network management may include inventorying or querying available equipment operating as part of the network or connected to the network, generating alerts based on observed device states or observed command activities related to the network, monitoring behaviors of target entities on the networks, recovering the various device over a network, securing device communications over the network, reporting information obtained via the network, or other management activities. For example, before, during, or even after a production events, commands executed by the various target entities (e.g., devices, actors, etc.) may be reported back to the content production management system for display to a stakeholder. Such behaviors could be reported via SNMP or a management information base (MB). For example, U.S. Pat. No. 10,958,512 to Soon-Shiong et al., titled "Fine Grained Network Management to Edge Device Features," filed Mar. 12, 2020, and hereby incorporated by reference in its entirety, describes methods by which such device behavior may be reported via MIB. Further, network management activities, especially observing communications to and from devices with respect to commands, execution of commands, or command queues can be presented via a dashboard to a stakeholder via software such as OpenNMS (see URL www.opennms.com). Consider a scenario where a director creates a set of commands to be used for a production at two or more studios. As each device executes their commands, the observed results of the executions can be transmitted back (e.g., via SNMP, XML, JSON, OpenNMS, etc.) to the director's dashboard on the display module of the content production management system. The dashboard may display the current state of each command queue and associated commands relative to their execution times. Deviations from the execution times may be highlighted or the visual presentation of the command queues may be altered to inform the director of such deviations.

Additional details regarding commands may also provide insights into various embodiments of the inventive subject matter. Commands, in general, can be considered data constructs or objects instantiated in one or more computer readable, non-transitory memories. In cases where object-oriented computer languages are used to create commands (e.g., C++, Java, Python, etc.), commands may be instantiated from one or more command classes. Thus, one can consider individual commands a distinct, manageable object. A command class may include additional data members (e.g., variables, constants, methods, APIs, functions, etc.) to facilitate management of commands in aggregate or commands individually. In other cases where non object-oriented languages (e.g., C, assembly, etc.) are used to create commands, commands may be created in memory using the language's data structures syntax (e.g., in C one may use typedef, struct, typedef struct, etc.).

One should appreciate the distinction between target entities and target devices that execute the commands. In some cases, the target entity and target device may be the same physical device; a camera for example. However, the target entity, say an actor, may not be the target device or a device at all. In such cases, the target device would likely be a device configured to or programmed to presents the target entity (e.g., the actor, etc.) a cue based on one or more associated commands. Therefore, the target device (e.g., a display screen, the LED wall, a speaker, etc.) may execute a command that in turn presents or otherwise renders instructions (e.g., a cue, etc.) to the target entity (e.g., actor, staff, crew, etc.). The target entity may then take action based on the received instructions. Thus, a command may include one or more attributes that associate the command to the target device and/or the target entity. Further, the command may have attributes that define a desired result to be achieved after execution of the command or after the action in response to a cue; a specific movement or action taken by the target entity. For example, a command class might have one or more member instance attributes indicating a target device type (e.g., device class, make, model, etc.) or a target entity type, which in turn may cause instantiation of available device commands according to the capabilities of the target device associated with the target entity. Such capabilities could be discovered via one or more discovery protocols or protocols that may be adapted for discovery (e.g., SSDP, SDP, SNMP, ICMP, proprietary discovery protocols, etc.). Upon execution of the device command, the observed result of the execution by the device may be reported back to the content production management system. In view that the target device and target entity may be different, there may be a delay between execution of the device command by the target device and observation of the target entity taking a corresponding action. The execution-action delay may be accounted for in determining the execution time of the command. Such approaches are advantageous for identifying or otherwise diagnosing issues within the ecosystem or for adapting, possibly in real-time, to the encountered action-delay issues.

Additional command attributes (e.g., member data variables, instance variables, etc.) associated with commands can be quite varied beyond execution times. Additional command attributes that may be used to manage commands may include one or more of the following: geolocation where the command is to be executed, target voxel of a command (e.g., a position in the 3D volume, etc.), the expected duration of a command execution, tolerances or criteria for commend execution indicating when execution is considered a success or failure, pointers or links to other commands or command queues to enable cascades of interdependent command executions, and so on just to name a few.

Yet another type of command attribute can include one or more command states, which may be part of a state machine embodiment. Command states indicate a current circumstance in which the command exists before, during, or after its execution. Example command states can include NULL where the command is being instantiated, but yet not fully defined. A state of PENDING can indicate the command is waiting for execution. A state of EXECUTING can indicate the command is currently executing. Such a state may be useful in scenarios where a command may take time to complete; an actor walking across a filming volume for example. A state of EXECUTED or COMPLETE can indicate the command is finished. Another type of command state, perhaps a primary state or a secondary state, can indicate if the execution was considered a success or not; possibly via a state of SUCCESS or FAIL. The various states a command can have may depend on the target entity or target device. In some embodiments, the commands may adhere to a state machine; possibly an entity specific or device specific state machine which allows only specific state transitions based on command execution or observed results of execution. In other embodiments, commands may have states defined by a stakeholder or other interfaces.

Commands may be generated in numerous ways. As discussed previously, one or more stakeholders may define a command via a user interface on the content production management system. However, it should be appreciated that commands are generated, ultimately, for at least one computing device. For example, a stakeholder may select one or more commands from a menu for execution on a target device. The selected command may then be instantiated with the necessary attributes or features as discussed above. Still further, one or more commands may be automatically generated by such computing devices. To continue the previous example, a selected command may require additional supporting commands to occur first, say a camera may be required to move across a volume, which may be physically in conflict with other equipment for the filming of a scene. Thus, the system may recognize the conflict due to the physical constraints of the filming volume and then generate additional device command targeting the conflicting equipment or conflicting target entity (e.g., move a prop, etc.). Thus, an aspect of the inventive subject matter is considered to include identifying commands that may give rise to conflicts in the volume and automatically generate commands, with corresponding execution times, to address the expected conflicts. When a conflict is found, the system can employ a back-chaining reasoning from the perspective of a current command's execution time to determine the execution of any predicated commands that may be necessary to resolve the conflict.

As alluded to previously, the disclosed system may employ one or more filming compilers capable of converting a priori defined filming information into device commands along with their desirable execution times. Consider a script or screen play. Such documents typically follow a highly structured format, which can be translated into device commands, possibly based on corresponding state machines. For example, a script can be analyzed via optical character recognition (OCR) to identify characters (e.g., actors, etc.), set direction, or other information. More specifically, when key features are found in the script, the compiler can auto generate associated device commands; perhaps a line of dialog instantiates a device command representing a cue for an actor. Once instantiated, the director or other stakeholder may use the content production management system to flesh out the command for deployment into the volumes. Beyond compiling scripts, a previs may also include a set of initial device commands in preparation for deployment to a target volume. The compiled previs commands, again, may be fleshed out via the content production management system. It should be appreciated the content production management system may include attributes relating to the available equipment (e.g., devices, cameras, etc.) and relating to the specific volumes, which in turn can be used to aid in populating the previs compiled commands to ensure the commands properly align to the reality of the target volume. Thus, commands that arise from compiled documents, previs, or other structured information can be populated with initial execution times based on a priori requirements, which may be altered to fit the reality of the filming volumes. Further, each production entity or the ecosystem as a whole can operate according to one or more state machines where state transitions occur possibly upon execution of commands.

An interesting aspect of executing commands in the distributed filming environment at specific execution times is that the observed execution times and observed results of the execution may be monitored to identify inconstancies with respect to expectations. Monitoring the results of execution may be achieved through a target device reporting back actual execution times and/or observed results. The observed results can then be compared to expected results as stored in the content production management system. The expect results may be defined by the stakeholder, by the compiled command set, or by other techniques. The various devices (e.g., cameras, microphones, sensors, etc.) in the ecosystem may observe the results of execution via capturing sensor data and executing one or more implementations of algorithms on the sensor data (e.g., activity recognition, image recognition, object recognition, natural language processing, OCR, classification techniques, prediction techniques, etc.). Deviations from the expected results may be quantified by comparing excepted result attributes to the actual result attributes. Such differences, possibly on an attribute-attribute basis, may be summed to generate a difference. In some scenarios the difference could be quantified from the result attribute space via generating a Euclidean distance, a Hamming distance, or other types of distances among the attributes, while accounting for or normalizing various attribute values if necessary.

In addition to commands, details regarding command queues may be of use. Command queues can also be implemented as objects in the computer science sense. Command queues may be instantiated from one or command queue classes, possibly based on underlying data structures (e.g., queue, deque, vector, map, trees, circular queues, stacks, etc.) where commands may be stored in a desirable order. Further instantiated command queues may inherit one or more device specific features, possibly including available commands (i.e., device capabilities) that may be stored in the queue for execution. When queried via an API, the instance command queue may report back a result set of available commands for the queue. This approach allows for the content production management system to ensure only commands that would work in a command queue would be generated for the command queue. Commands may be "pushed" (e.g., enqueued, etc.) into the queue or "popped" (e.g., dequeued, etc.) off the queue according the corresponding data structure's APIs.

Command queues preferably store commands in a specified order, by execution times in more preferable embodiments. For example, a command queue might place commands with the earliest execution times at the head of the queue and commands with the latest execution times placed at the end of the queue. When the queue or queue manager determines that a command's execution time has arrived, the command may be popped off the head of the queue and executed. One should appreciate that some commands may have a duration or a length of time before the command has completed its execution. In such cases, the EXECUTING command may be placed in a separate executing queue until execution is complete. Upon completion of execution, the command may then be removed from the executing queue and any reporting necessary can be reported back to registered stakeholders. Therefore, one should appreciate that devices may employ more than one type of command queue to manage the commands through a command's life time or as the command changes state.

A command queue may be a passive command queue or an active command queue. A passive command queue operates based on calls to the queue's APIs external to the passive command queues data structure(s). Said a different way, a passive command queue does not directly cause execution of its own commands and relies on an external manager relative to the queue to cause execution of the command. An active command queue can be considered a queue object that manages its own commands and ensures the commands are executed upon satisfaction of the command's triggering criteria. Such queues operate on their own agency. For example, an active command queue may include one or more listeners that observe an inflow of environmental sensor data, including a current time. When the queue's listener observes sensor data (e.g., internal state data, external state data, etc.) and/or a current time that satisfies a command's triggering criteria, likely command at the head of the queue, the queue causes execution of the command. The command execution may take the form of transmitting a signal to a device, calling an API for a device, executing a script, executing one or more software instructions, or other forms of device execution. Further, an active queue may report the results of execution back to interested or registered devices; the content production management system, for example. Additionally, the active command queue may notify other command queues that execution has been initiated or completed so that any pending commands in the other command queues may be released for execution.

Depending on the nature of the target device, the device's corresponding command queue or queues may be locally resident, remote from the device, or even in an intermediary device. Target devices having sufficient computing resources (e.g., RAM, CPU, cores, etc.), may have an execution environment that is programmatically available (e.g., a VM, container, script engine, etc.) that permits or enables local instantiation of a command queue and further enables local execution of the commands. Other target devices lacking such resources may only be able to respond to signals received from external sources. For example, a small device might only respond to signals received over a PIO pins. In such cases, the command queue might be located in an external queue management device that provides signals in the PIO pins response to execution of the commands, which then cause the small device to take action. Such external queue management device may be remote or be implemented on remote computers over a network (e.g., a content production management system, etc.). Still further an external queue management device could be an intermediary device connected to the target device and to the content management system. In such scenarios, the queue management device may operate as a device server or adapter that receives command queue management functions from the content production management server and then manages execution of the corresponding commands via sending signals to the target device. As mentioned previously, such device servers or adapters may be obtained from various vendors and then programmed or provisioned with the necessary command queue functionality. Additional devices that could operate as such adapters may include Arduino™ or Raspberry Pi™ devices.

Yet another area of consideration includes management of the various production volumes. Each production volume has its own specific characteristics including size, shape, actual filming volume (e.g., stage, LED walls, etc.), total available production volume (e.g., area for cameras or staff, etc.), available equipment and their properties, schedules, costs, or other sets of attributes describing the nature of the volume. Such volume characteristics may be useful when populating commands with their features or determining where command queues should be placed to ensure production among the volumes and choreography among all devices are properly synchronized when commands are executed at their desired execution times.

There are numerous techniques for managing volumes. An especially interesting technique centers on voxel management for volumes. Voxel management includes breaking a volume down into voxels (i.e., a volumetric cell) where a volume's set of voxels would, in most cases, fill the corresponding volume. Said in a different way, a voxel can be considered a 3D analog of a 2D floor tile where a set of floor tiles cover an area. Similarly, a set of voxels may fill a volume. A voxel may be considered a virtual data object in the memory of a computing device; say the memory of the content production management system. A volume's voxels may be all the same size, different sizes, same shapes, different shapes, or may be sized and dimensioned as desired. Shapes could be any 3D shape (e.g., cube, sphere, rectangular cube, irregularly shaped 3D shapes, tetrahedrons, cylinders, prisms, cones, platonic solids, etc.). In some embodiments, voxels may not overlap while in other embodiments voxels may overlap each other to some degree. Further, the voxels may completely fill the volume or partially fill the volume, at least portions of the volume that might require volume management with respect to commands or command queue management.

In view that each volume might have different physical shapes, each volume may have different sets of voxels. For example, a first studio focusing on high fidelity foreground action might have a very fine grain set of voxels, say 10 cm cubes that fill the volume, perhaps down to a specific 3D point. Meanwhile, a second studio focusing on background, largely static, content might require a more coarse grained set of voxels, perhaps 100 cm cubes. From the perspective of the content production management system, a first volume's set of voxels may be mapped to a second volume's set of voxels via a transform (e.g., $V_2=T(V_1)$, etc.), where the transform T may be implemented as a computer-based function (e.g., one-to-one mapping, continuous mapping, discontinuous mapping, etc.). Such transforms may cause or include transforms of cells (e.g., scale, rotate, skewing, translate, shear, reflection, affine, etc.) to enable a desirable mapping. While this example focuses on two volumes, it should be appreciated that more than one studio's volumes may be mapped to yet another, possibly a virtual volume leveraged by the content production management system to integrate resulting content into a more complete set of content or more final integrated result.

Management of voxels in a filming volume gives rise to multiple interesting capabilities with respect to the command and command queue inventive subject matter. Consider a scenario where a stakeholder wishes to integrate content from multiple volumes and where each of the volumes have their own set of voxels. The sets of voxels are then integrated, via suitable transforms, together into a virtual production volume at the stakeholder's content production management system. The stakeholder also compiles a set of desirable commands (e.g., from scripts, previs, state machine, etc.) along with corresponding command queues for production of the content or portion thereof. Rather than simply executing all commands in a live production, the content production management system, or other suitably enabled computing device, may run a simulation of the production via simulated execution of the commands in the various command queues within the virtual volume. Simulations may leverage game engines such as the UnReal® game engine or the Unity® game engine. As each command is executed, the impact on individual voxels, preferably in the virtual production volume, may be monitored. For example, monitoring voxels in a simulation may indicate if an actor moves through or otherwise occupies one or more expected voxels, or alternatively one or more unexpected voxels. This approach aids in ensuring the execution of commands, along with their execution times, occur as expected or desired, while also identifying potential conflicts. In some embodiments, the results from running simulations of executing command in command queues provides for creating a voxel heat map showing occurrences or frequencies of how execution of the commands impacts voxels. Such an approach is considered advantageous, while similar to a previs, because it allows for immediate comparison of expected behavior to the physical reality of the production volumes, especially with respect to how the volumes should integrated together, which is typically lacking in a previs.

Using voxels in volume management gives rise to other interesting capabilities beyond command simulation management or command conflict management. In some embodiments, voxels may be individually addressable in a manner that allows the content production management system to send commands, or other messages, to a voxel or a set of voxels. For example, a group of voxels (e.g., one or more voxels, block of voxels, set of voxels, etc.) may be assigned an IP address (or other addressable identifier, possibly in a well-defined namespace) and treated as a virtual device. The group of voxels may also have one or more corresponding command queues. Such an approach is advantageous in circumstances where equipment, devices, actors, or other target entities may move in more non-deterministic fashions (e.g., unscripted, adlibbed, etc.). When target entities move through the voxels, the commands may be transmitted to target entities corresponding target device. Thus, in this example, the commands and their execution times may be delayed until the system (e.g., controllable devices, cameras, game engines, etc.) detects the presence of an entity within the voxel. At which point, the system instructs the target device to execute the commands.

CONCLUSION

By employing one or more aspects of the teachings herein, travel associated with content production may be reduced. For example, actors may be allowed to film at nearby studios instead of traveling across the world. Additionally, by employing one or more aspects of the teachings, the final product at the conclusion of filming may be much closer to a final production of a movie, television show, etc. than with conventional systems. This may reduce, for example, post-production time and costs. For example, approximately 400 days of work may be required to create a movie using green screen technology, and approximately 50 days of work may be required to create the same movie using LED wall technology. However, use of the distributed studio environments disclosed herein may greatly reduce the time of post-production, building props, studio setup configurations, etc. as compared to the conventional systems.

It should be appreciated that the teachings disclosed herein may be employed in various applications. For example, while the teachings herein are largely described in relation to a content production environment, it should be appreciated that the teachings may be employed in other applications including remote users, systems, etc. For instance, the teachings may also be employed in physical training applications (e.g., with remote trainers and trainees), team training applications, education applications (e.g., remote learning applications, simulations, etc.), military applications, news, motion capture applications, eSports (e.g., tournaments, virtual camera operators, replays, etc.) etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code, software instructions, or other executable data and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects, possibly forming a software suite. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Julia, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SEVIULINK, or Python®.

What is claimed is:

1. A distributed studio management system comprising:
   at least one studio computing system including at least one computer readable memory and at least one processor,
   wherein the studio computing system is associated with a local first studio production facility that is remote to a remote second studio production facility, and
   wherein the at least one processor, upon execution of software instructions stored in the computer readable memory, is configured to perform the operations of:
   receiving a set of device commands having commands targeting a first device and a second device in the local first studio production facility and where the set of device commands are related to the remote second studio production facility;
   enqueuing a first command from the set of device commands into a first command queue assigned to the first device and a second command from the set of device commands into a second command queue assigned to the second device according to each device command's synchronized execution times; and
   causing the first device and the second device to execute commands from their respective command queues relative to each other according to the commands' respective synchronized execution times.

2. The distributed studio management system of claim 1, wherein the first device includes a display and the second device includes a robot.

3. The distributed studio management system of claim 2, wherein the first command includes instructions for rendering a visual cue.

4. The distributed studio management system of claim 1, wherein the first device and the second device include moveable elements in the local first studio production facility.

5. The distributed studio management system of claim 4, wherein the moveable elements include at least two of the following: a camera, a boom, a robot, a vehicle, a moveable platform, a moveable LED wall, a gimbal, and a prop.

6. The distributed studio management system of claim 1, wherein the synchronized execution times of commands in the set of device commands are defined based on a latency measured relative to the remote second studio production facility.

7. The distributed studio management system of claim 6, wherein the at least one processor, upon execution of software instructions, is further configured to perform the operation of measuring the latency relative to the remote second studio production facility.

8. The distributed studio management system of claim 7, wherein the operation of measuring the latency includes obtaining times based on at least one of the following: a GPS sensor, a network time protocol (NTP), a ping time, a round trip time (RTT), a time to first byte (TTFB), an observed human behavior, a simulation, and a time to execute a command.

9. The distributed studio management system of claim 6, wherein the synchronized execution times of the commands in the set of device commands are defined relative to at least one execution time of a third command by a third device in the remote second studio production facility.

10. The distributed studio management system of claim 9, wherein execution of the first command and the second command in the local first studio production facility are out of synch relative to execution of the third command by the third device in the remote second studio production facility.

11. The distributed studio management system of claim 9, wherein the third device includes at least one of the following: a camera, a boom, a robot, a vehicle, a moveable platform, a moveable LED wall, a gimbal, and a prop.

12. The distributed studio management system of claim 6, wherein the latency includes a network latency.

13. The distributed studio management system of claim 6, wherein the local first studio production facility and the remote second studio production facility are geographically separated.

14. The distributed studio management system of claim 13, wherein the latency between the local first studio production facility and the remote second studio production facility are geographically separated by at least 10 km.

15. The distributed studio management system of claim 6, wherein the latency is at least 5 ms.

16. The distributed studio management system of claim 1, wherein the local first studio production facility includes at least one of the following: an outdoor setting, a stage, a LED wall, and a street.

17. The distributed studio management system of claim 1, wherein the at least one processor, upon execution of software instructions, is further configured to perform the operation of archiving a result of execution of at least one of the first command and the second command.

18. The distributed studio management system of claim 17, wherein the result is archived on a notarized ledger stored in the at least one computer readable memory.

19. The distributed studio management system of claim 18, wherein the notarized ledger includes at least one of the following: a distributed ledger, a blockchain, a smart contract ledger, and a hash graph.

20. The distributed studio management system of claim 18, wherein the result includes a non-fungible token (NFT) recorded on the notarized ledger.

21. The distributed studio management system of claim 20, wherein the at least one processor, upon execution of software instructions, is further configured to perform the operation of minting the result as the NFT.

* * * * *